US011989351B2

(12) United States Patent
Farley

(10) Patent No.: US 11,989,351 B2
(45) Date of Patent: May 21, 2024

(54) VIRTUAL, AUGMENTED AND MIXED REALITY SYSTEMS WITH PHYSICAL FEEDBACK

(71) Applicant: Adam Farley, Chichester (GB)

(72) Inventor: Adam Farley, Chichester (GB)

(73) Assignee: Adam Farley, Chichester (GB)

( * ) Notice: Subject to any disclaimer, the term of this patent is extended or adjusted under 35 U.S.C. 154(b) by 234 days.

(21) Appl. No.: 17/609,730

(22) PCT Filed: May 6, 2020

(86) PCT No.: PCT/GB2020/051112
§ 371 (c)(1),
(2) Date: Nov. 8, 2021

(87) PCT Pub. No.: WO2020/225556
PCT Pub. Date: Nov. 12, 2020

(65) Prior Publication Data
US 2022/0214750 A1    Jul. 7, 2022

(30) Foreign Application Priority Data

May 7, 2019    (GB) ...................................... 1906420

(51) Int. Cl.
*G06F 3/03*    (2006.01)
*G06F 3/01*    (2006.01)
(Continued)

(52) U.S. Cl.
CPC ............ *G06F 3/0304* (2013.01); *G06F 3/011* (2013.01); *G06F 3/013* (2013.01); *G06F 3/016* (2013.01);
(Continued)

(58) Field of Classification Search
CPC ........ G06F 3/0304; G06F 3/011; G06F 3/013; G06F 3/016; G06T 11/00; G06V 20/13;
(Continued)

(56) References Cited

U.S. PATENT DOCUMENTS 5,771,181 A    6/1998    Moore et al.
7,725,279 B2   5/2010    Luinge et al.
(Continued)

FOREIGN PATENT DOCUMENTS

AU    2017220404 A1    7/2018
CA       2993747 A1    2/2017
(Continued)

OTHER PUBLICATIONS

Anonymous: "Haptic suit—Wikipedia", Mar. 4, 2019, XP055714931, URL: https://en.wikipedia.org/w/index.php?title=Haptic_suit&oldid=886115967.
(Continued)

*Primary Examiner* — William Lu
(74) *Attorney, Agent, or Firm* — Ryan Dean; Umberg Zipser LLP

(57) ABSTRACT

A system is disclosed, comprising an array of sensors disposed on a plurality of aerial vehicles, a sensor array controller for controlling the plurality of aerial vehicles, a physical feedback mechanism for providing physical feedback to a user, the physical feedback mechanism being configured to be worn on the user's body, and a feedback controller. The sensor array controller is configured to reposition the plurality of aerial vehicles so as to provide a line of sight between each one of the plurality of sensors and a respective part of the user's body monitored by said one of the plurality of sensors. The feedback controller is configured to determine a current position of the user's body based on information obtained using the plurality of sensors, and
(Continued)

to control the physical feedback mechanism to provide physical feedback to the user in dependence on the determined position of the user's body.

22 Claims, 5 Drawing Sheets

(51) Int. Cl.
    *G06T 11/00*     (2006.01)
    *G06V 20/13*     (2022.01)
    *G06V 20/17*     (2022.01)
    *G06V 40/10*     (2022.01)
    *G06V 40/20*     (2022.01)

(52) U.S. Cl.
    CPC .............. *G06T 11/00* (2013.01); *G06V 20/13* (2022.01); *G06V 20/17* (2022.01); *G06V 40/103* (2022.01); *G06V 40/23* (2022.01)

(58) Field of Classification Search
    CPC ...... G06V 20/17; G06V 40/103; G06V 40/23; B64U 2101/30; B64U 2201/102; B64U 10/13; B64C 39/024; G05D 1/0094; G05D 1/104
    See application file for complete search history.

(56) References Cited

U.S. PATENT DOCUMENTS

| | | | |
|---|---|---|---|
| 8,203,487 B2 | 6/2012 | Hol et al. | |
| 8,657,772 B2 | 2/2014 | Einarsson | |
| 9,892,546 B2* | 2/2018 | Jenkins | G06T 19/003 |
| 10,146,047 B1* | 12/2018 | Cheng | G02B 26/103 |
| 10,406,059 B2* | 9/2019 | Agrawal | A61H 1/0262 |
| 10,415,975 B2 | 9/2019 | Bellusci et al. | |
| 10,535,199 B1* | 1/2020 | Bond | G06T 15/08 |
| 11,311,209 B1* | 4/2022 | Berme | A61B 5/1038 |
| 11,417,088 B2* | 8/2022 | Nishio | G06V 20/10 |
| 11,434,004 B2* | 9/2022 | Thörn | B64C 39/024 |
| 11,461,936 B2* | 10/2022 | Freeman | G06F 3/017 |
| 2004/0207542 A1* | 10/2004 | Chang | G06F 1/1626 |
| | | | 341/20 |
| 2006/0150753 A1 | 7/2006 | Massimo et al. | |
| 2007/0203543 A1* | 8/2007 | Stone | A61N 1/37247 |
| | | | 607/59 |
| 2009/0240170 A1* | 9/2009 | Rowley | A61B 5/6831 |
| | | | 600/595 |
| 2010/0092079 A1* | 4/2010 | Aller | B42D 15/00 |
| | | | 235/494 |
| 2011/0046915 A1 | 2/2011 | Hol et al. | |
| 2012/0025945 A1 | 2/2012 | Yazadi et al. | |
| 2016/0131761 A1* | 5/2016 | Yates | G01S 7/4917 |
| | | | 356/3.11 |
| 2016/0259417 A1* | 9/2016 | Gu | G06F 3/014 |
| 2016/0266645 A1 | 9/2016 | Marozau et al. | |
| 2016/0349835 A1* | 12/2016 | Shapira | G02B 27/017 |
| 2016/0378109 A1* | 12/2016 | Raffa | G08G 5/0043 |
| | | | 701/2 |
| 2017/0083085 A1* | 3/2017 | Rubin | A63F 13/21 |
| 2017/0108929 A1* | 4/2017 | Sinko | G06F 3/016 |
| 2017/0220110 A1 | 8/2017 | Hollander | |
| 2017/0277200 A1* | 9/2017 | Wang | G05D 1/0202 |
| 2017/0322628 A1* | 11/2017 | Tan | G06F 3/016 |
| 2017/0332946 A1* | 11/2017 | Kikkeri | A61B 5/1116 |
| 2017/0334559 A1* | 11/2017 | Bouffard | G08G 5/0034 |
| 2017/0336806 A1* | 11/2017 | Blanc-Paques | G08G 5/045 |
| 2018/0012074 A1 | 1/2018 | Holz et al. | |
| 2018/0063429 A1* | 3/2018 | Enriquez | B63G 8/22 |
| 2018/0089349 A1* | 3/2018 | Rezgui | G06F 40/103 |
| 2018/0100731 A1* | 4/2018 | Pau | H04N 25/133 |
| 2018/0126241 A1* | 5/2018 | Hung | G06F 3/017 |
| 2018/0181119 A1* | 6/2018 | Lee | B64C 39/024 |
| 2018/0196515 A1 | 7/2018 | Appleyard et al. | |
| 2018/0224928 A1 | 8/2018 | Ross et al. | |
| 2018/0224930 A1 | 8/2018 | Folmer et al. | |
| 2018/0232050 A1 | 8/2018 | Ofek et al. | |
| 2018/0234669 A1 | 8/2018 | Chen et al. | |
| 2018/0335841 A1 | 11/2018 | Rubin et al. | |
| 2018/0335842 A1 | 11/2018 | Rubin et al. | |
| 2019/0104250 A1* | 4/2019 | Sheftel | G08G 5/04 |
| 2019/0130622 A1* | 5/2019 | Hoover | G06F 3/017 |
| 2019/0204921 A1 | 7/2019 | Goupil et al. | |
| 2019/0369613 A1* | 12/2019 | Moon | G01S 19/42 |
| 2020/0096763 A1* | 3/2020 | Shin | G02B 27/4205 |
| 2023/0091992 A1* | 3/2023 | Davidson | A61B 5/6823 |
| | | | 473/215 |

FOREIGN PATENT DOCUMENTS

| | | |
|---|---|---|
| CA | 2926921 A1 | 10/2017 |
| CN | 101819462 A | 9/2010 |
| CN | 102717383 A | 10/2012 |
| CN | 202771366 U | 3/2013 |
| CN | 101801456 B | 8/2014 |
| CN | 204840790 U | 12/2015 |
| CN | 105222761 A | 1/2016 |
| CN | 105892626 A | 8/2016 |
| CN | 106708269 A | 5/2017 |
| CN | 106843504 A | 6/2017 |
| CN | 104423039 B | 7/2017 |
| CN | 206431575 U | 8/2017 |
| CN | 206757533 U | 12/2017 |
| CN | 107589831 A | 1/2018 |
| CN | 107632701 A | 1/2018 |
| CN | 107728778 A | 2/2018 |
| CN | 107927950 A | 4/2018 |
| EP | 1959831 B1 | 7/2010 |
| ES | 2214115 A1 | 9/2004 |
| GB | 2573091 A | 11/2020 |
| JP | 2015153387 A | 8/2015 |
| JP | 2018036993 A | 3/2018 |
| KR | 20140011688 A | 1/2014 |
| KR | 20170114458 A | 10/2017 |
| KR | 20180007245 A | 1/2018 |
| KR | 101841365 B1 | 3/2018 |
| KR | 20180025416 A | 3/2018 |
| KR | 101848690 B1 | 4/2018 |
| MX | 2015001947 A | 8/2016 |
| TW | I642039 B | 11/2018 |
| WO | 2009014644 A1 | 1/2009 |
| WO | 2016171588 A2 | 10/2016 |
| WO | 2017118939 A1 | 7/2017 |
| WO | 2018077255 A1 | 5/2018 |
| WO | 2018100518 A1 | 6/2018 |
| WO | 2018107781 A1 | 6/2018 |
| WO | 2018112112 A1 | 6/2018 |
| WO | 2018121708 A1 | 7/2018 |

OTHER PUBLICATIONS

European Patent Office, International Preliminary Report on Patentability, dated Dec. 9, 2020.

Pascal Knierim et al: "Tactile Drones—Providing Immersive Tactile Feedback in Virtual Reality through Quadcopters", Human Factors in Computing Systems, ACM, May 6, 2017, pp. 433-436, XP058338567, DOI: 10.1145/3027063.3050426.

Bouzit, et al., The Rutgers Master II—New Design Force—Feedback Glove, IEEE/ASME Transactions on Mechatronics, vol. 7, No. 2, Jun. 2002, available at http://www.ti.rutgers.edu/publications/papers/2002_ieee_mech_bouzit.pdf.

CyberGlove Systems, CyberGlove II, available at http://www.cyberglovesystems.com/cyberglove-ii/.

D. Wang, et al., "Toward Whole-Hand Kinesthetic Feedback: A Survey of Force Feedback Gloves," in IEEE Transactions on Haptics, vol. 12, No. 2, pp. 189-204, Apr. 1-Jun. 2019, doi: 10.1109/TOH.2018.2879812.

* cited by examiner

VIRTUAL, AUGMENTED AND MIXED REALITY SYSTEMS WITH PHYSICAL FEEDBACK

TECHNICAL FIELD

The present invention relates to virtual, augmented and mixed reality systems with physical feedback.

BACKGROUND

Systems which provide virtualised user experiences, such as virtual reality, augmented reality and mixed reality systems, have been developed in which the user can receive some form of physical stimulus to provide a more immersive experience. For example, when a user observes a part of their body coming into contact with part of a virtual object or environment through a virtual reality, augmented reality or mixed reality display device, such as a headset display, an apparatus may be controlled to make physical contact with the part of the user's body that is observed to be in contact with the virtual object or environment. In this way, the visual stimulus provided to the user is reinforced by a synchronised physical stimulus.

In such systems, the position of parts of the user's body to which physical stimuli can be provided should be tracked with reasonable precision, to provide a more convincing virtualised experience. Typically, the user's current body position is determined using images captured by one or more cameras. However, situations can arise in which it is difficult or impossible to accurately determine the user's current position, resulting in a discrepancy between the user's actual body position and the location of physical stimuli. It would therefore be desirable to provide a system for more accurately tracking the user's body position in virtual, augmented and mixed reality systems which provide physical stimuli.

SUMMARY OF THE INVENTION

According to a first aspect of the present invention, there is provided a system for enabling a user to interact with virtual objects, the system comprising: a sensor array comprising a plurality of sensors each arranged to monitor a current position of a different part of the user's body; a plurality of aerial vehicles, each one of the plurality of sensors being disposed on a respective one of the plurality of aerial vehicles; a sensor array controller configured to reposition the plurality of aerial vehicles so as to provide a line of sight between each one of the plurality of sensors and a respective part of the user's body monitored by said one of the plurality of sensors; a physical feedback mechanism for providing physical feedback to the user, the physical feedback mechanism being configured to be worn on the user's body; and a physical feedback controller configured to determine a current position of the user's body based on information obtained using the plurality of sensors, and to control the physical feedback mechanism to provide physical feedback to the user in dependence on the determined position of the user's body.

In some embodiments according to the first aspect, the system comprises a rendering unit configured to render an image including a virtual representation of at least part of the user's body, in dependence on the determined current position of the user's body, and a display unit configured to display the rendered image to the user.

In some embodiments according to the first aspect, the rendering unit is configured to render a third-person perspective view of the user's body from a viewpoint of one of the plurality of sensors.

In some embodiments according to the first aspect, the system comprises a user interface configured to receive user input indicative of a desired viewpoint of the third-person perspective view, wherein the sensor array controller is configured to control one of the plurality of aerial vehicles to adopt a position corresponding to the desired viewpoint indicated by the user input.

In some embodiments according to the first aspect, the system comprises a user interface configured to receive a user command to switch from a first-person viewing mode to a third-person viewing mode, wherein in response to the user command the rendering unit is configured to render the third-person perspective view of the user's body from the viewpoint of one of the plurality of sensors.

In some embodiments according to the first aspect, the physical feedback mechanism comprises a plurality of location sensors distributed over at least part of the user's body, each of the location sensors being configured to provide information on a current location of a respective surface of the user's body, wherein the controller is configured to determine the current position of the user's body based on the information obtained using the plurality of sensors and based on the information provided by the plurality of location sensors.

In some embodiments according to the first aspect, the user's body may comprise visible surfaces and occluded surfaces depending on the current position of the user's body and a current spatial arrangement of the plurality of sensors, the visible surfaces comprising parts of the user's body visible to one or more of the plurality of sensors and the occluded surfaces comprising parts of the user's body hidden from view of the plurality of sensors, and wherein when at least one of the location sensors is disposed on an occluded surface of the user's body, the controller is configured to determine the current position of the user's body by determining the current position of said occluded surface based on information obtained from said at least one of the location sensors, and by determining the current position of any visible surfaces based on the information obtained using the plurality of sensors.

In some embodiments according to the first aspect, the controller is configured to determine the current position of one or more visible surfaces based on the information obtained using the plurality of sensors, and based on information obtained from at least one of the plurality of location sensors disposed on said one or more visible surfaces.

In some embodiments according to the first aspect, the plurality of location sensors include location sensors disposed on opposing surfaces of one or more parts of the user's body, such that when one or both of the opposing surfaces is an occluded surface the controller may determine the current position of said part of the user's body based on the information provided by said location sensors.

In some embodiments according to the first aspect, the plurality of location sensors comprise inertial sensors.

In some embodiments according to the first aspect, the physical feedback mechanism comprises a tactile feedback mechanism configured to provide tactile stimulus to at least part of the user's body.

In some embodiments according to the first aspect, the tactile feedback mechanism comprises a plurality of actuators controllable to exert a variable force on a surface of the body.

In some embodiments according to the first aspect, the plurality of actuators are more closely spaced in a region of the body having a higher density of touch receptors, and are less closely spaced in a region of the body having a lower density of touch receptors.

In some embodiments according to the first aspect, the physical feedback mechanism comprises a kinaesthetic feedback mechanism configured to provide kinaesthetic stimulus to at least part of the user's body.

In some embodiments according to the first aspect, the kinaesthetic feedback mechanism comprises an exoskeleton assembly configured to be worn on part or the whole of the user's body, the exoskeleton assembly comprising: a plurality of exoskeleton members connected by one or more moveable joints, and one or more actuators associated with each moveable joint of the exoskeleton assembly, each actuator being controllable by the controller to provide the kinaesthetic stimulus by exerting a force on respective ones of the plurality of exoskeleton members connected to said moveable joint.

In some embodiments according to the first aspect, the system further comprises one or more joint sensors each configured to detect a position of a corresponding one of said one or more moveable joints, wherein the controller is configured to determine the current position of the user's body based on information obtained from the one or more joint sensors and based on the information obtained from the plurality of sensors disposed on the plurality of aerial vehicles.

In some embodiments according to the first aspect, the physical feedback mechanism is configured to exert a variable resistance to the user's movements in dependence on control signals received from the controller.

In some embodiments according to the first aspect, the plurality of exoskeleton members include one or more adaptive members configured to have a controllable bending stiffness.

In some embodiments according to the first aspect, the plurality of exoskeleton members comprise two or more exoskeleton members disposed on opposing surfaces of one or more parts of the user's body.

In some embodiments according to the first aspect, the system comprises a positioning unit disposed on the user's body, the positioning unit configured to determine coordinates of a current location of the positioning unit in three-dimensional space, wherein the sensor array controller is configured to control each one of the plurality of aerial vehicles to maintain a set position in three-dimensional space relative to the determined coordinates.

In some embodiments according to the first aspect, the sensor array controller is configured to control the plurality of aerial vehicles to adopt positions at least a minimum distance from the determined coordinates of the positioning unit.

In some embodiments according to the first aspect, the sensor array controller is configured to determine the minimum distance in dependence on a known location of the positioning unit on the user's body, and on a maximum distance from said known location that can be reached by maximal extension of one or more limbs of the user's body.

In some embodiments according to the first aspect, the sensor array controller is configured to determine a length of each of said one or more limbs based on information obtained using the plurality of sensors, and to determine the maximum distance in dependence on the determined length of the one or more limbs.

In some embodiments according to the first aspect, the positioning unit is configured to determine the coordinates using a global navigation satellite system.

In some embodiments according to the first aspect, the plurality of aerial vehicles comprise a master aerial vehicle and one or more slave aerial vehicles, wherein the sensor array controller is configured to set a respective position for each of the one or more slave aerial vehicles relative to the position of the master aerial vehicle.

In some embodiments according to the first aspect, the controller is configured to determine a current gaze point of the user, and the sensor array controller is configured to position the master aerial vehicle such that one of the plurality of sensors disposed on the master aerial vehicle is directed towards the determined gaze point.

In some embodiments according to the first aspect, the system comprises an eye tracking sensor configured to detect a current gaze direction of the user, wherein the controller is configured to determine the current gaze point based on information received from the eye tracking sensor, and reposition the master aerial vehicle in dependence on a determination that the current gaze point differs from a previously-determined gaze point.

In some embodiments according to the first aspect, the sensor array controller is configured to set the position for the master aerial vehicle relative to the determined coordinates of the positioning unit.

In some embodiments according to the first aspect, different ones of the plurality of aerial vehicles may be designated as the master aerial vehicle, and the sensor array controller is configured to designate one of the one or more slave aerial vehicles as the master aerial vehicle in response to a change in the coordinates of the positioning unit and/or an orientation of the user's body.

In some embodiments according to the first aspect, the controller is configured to determine whether a predicted time for the master aerial vehicle to move from its current location to the set position for the master aerial vehicle exceeds a time limit, and to control the master aerial vehicle to move from its current location to the set position for the master aerial vehicle in response to a determination that the predicted time does not exceed the time limit, or to designate said one of the slave aerial vehicles as the master aerial vehicle in dependence on a determination that the predicted time exceeds the time limit.

In some embodiments according to the first aspect, the time limit is set in dependence on the user's current speed of movement, such that a shorter time limit is set when the user is moving more quickly.

In some embodiments according to the first aspect, the plurality of sensors are moveably mounted such that each sensor can be independently reoriented.

In some embodiments according to the first aspect, the sensor array controller is configured to reorient one or more of the plurality of sensors in addition to repositioning the plurality of aerial vehicles, so as to provide a line of sight between each one of the plurality of sensors and a respective part of the user's body monitored by said one of the plurality of sensors.

In some embodiments according to the first aspect, the plurality of sensors comprises a head-mounted sensor configured to be worn on the user's head.

In some embodiments according to the first aspect, the head-mounted sensor is an imaging sensor arranged so as to capture an image indicative of the user's current field of view.

In some embodiments according to the first aspect, the plurality of sensors are configured to have variable focal lengths.

In some embodiments according to the first aspect, the sensor array controller is configured to increase or decrease a focal length of one or more of the plurality of sensors in addition to repositioning the plurality of aerial vehicles, so as to provide a line of sight between each one of the plurality of sensors and a respective part of the user's body monitored by said one of the plurality of sensors.

In some embodiments according to the first aspect, the sensor array controller is configured to determine a number of the aerial vehicles required to determine the current position of the user's body with a desired degree of accuracy, wherein in response to the determined number of aerial vehicles being less than a number of aerial vehicles currently comprised in the sensor array, the sensor array controller is configured to switch one or more redundant aerial vehicles into a standby mode in which said one or more redundant aerial vehicles do not form part of the sensor array, and wherein in response to the determined number of aerial vehicles being greater than the number of aerial vehicles currently comprised in the sensor array, the sensor array controller is configured to switch one or more aerial vehicles from the standby mode into an active mode in which said one or more aerial vehicles form part of the sensor array.

In some embodiments according to the first aspect, the sensor array controller is configured to take into account a current body position of the user when determining the number of aerial vehicles required.

In some embodiments according to the first aspect, the sensor array controller is configured to determine a current orientation in space of one or more anatomical planes of the user's body, based on information obtained using the plurality of sensors, and is further configured to control each one of the plurality of aerial vehicles to maintain a set position relative to the one or more anatomical planes. For example, in some embodiments the one or more anatomical planes include a frontal plane, and/or a sagittal plane, and/or a transverse plane.

In some embodiments according to the first aspect, the sensor array controller is configured to determine the current orientation in space of said one or more anatomical planes based on the determined coordinates of the positioning unit.

In some embodiments according to the first aspect, the plurality of aerial vehicles comprise first, second, third and fourth aerial vehicles, wherein the sensor array controller is configured to control the first and second aerial vehicles to adopt positions on opposite sides of the user's body along an intersection between the transverse plane and the sagittal plane, and wherein the sensor array controller is configured to control the third and fourth aerial vehicles to adopt positions on opposite sides of the user's body, along an intersection between the transverse plane and the frontal plane.

In some embodiments according to the first aspect, the plurality of sensors comprise a plurality of cameras arranged to capture images of the user's body. For example, in some embodiments the plurality of cameras may comprise infrared depth cameras.

In some embodiments according to the first aspect, the tactile feedback controller is configured to apply a body recognition algorithm to one or more images captured by the plurality of cameras to determine whether an object is part of the user's body.

BRIEF DESCRIPTION OF THE DRAWINGS

Embodiments of the present invention will now be described, by way of example only, with reference to the accompanying drawings, in which.

DETAILED DESCRIPTION

Figure 1:
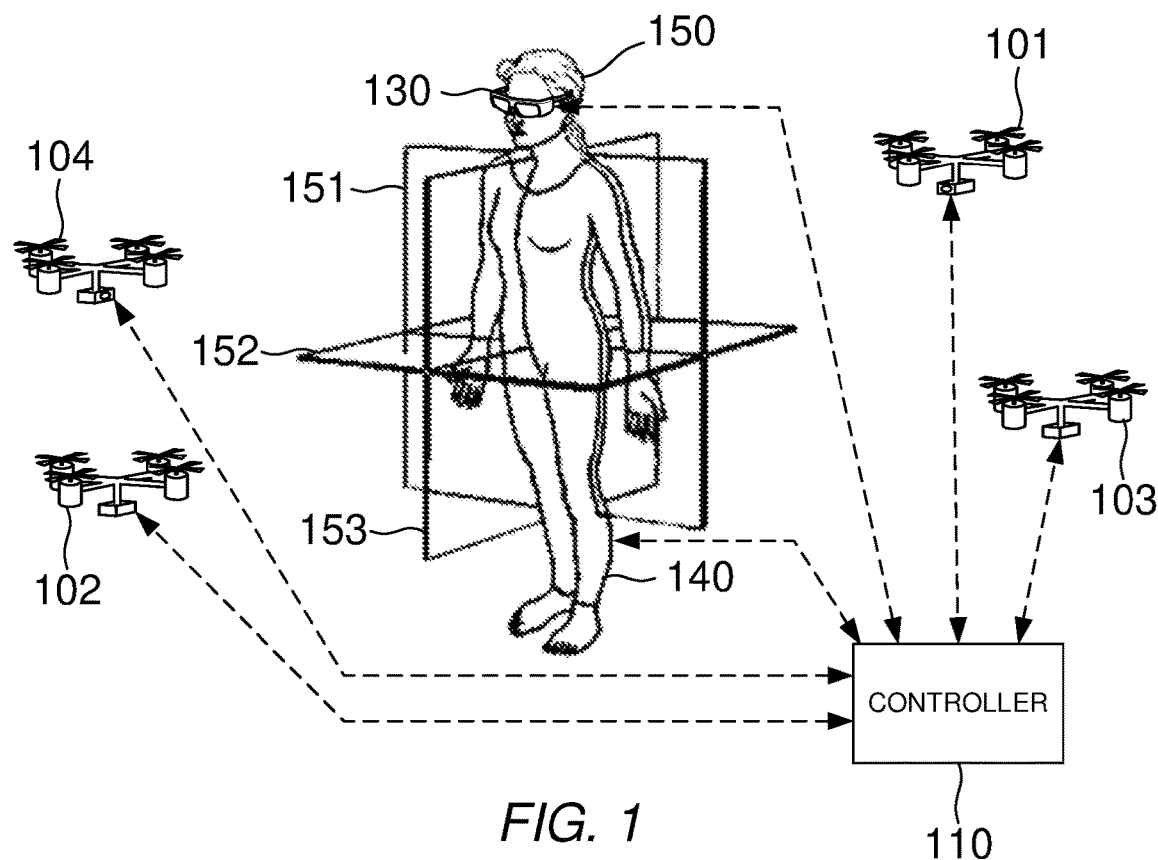
FIG. 1 illustrates a system according to an embodiment of the present invention.

In the following detailed description, only certain exemplary embodiments of the present invention have been shown and described, simply by way of illustration. As those skilled in the art would realise, the described embodiments may be modified in various different ways, all without departing from the scope of the present invention.

Accordingly, the drawings and description are to be regarded as illustrative in nature and not restrictive. Like reference numerals designate like elements throughout the specification.

Figure 2:
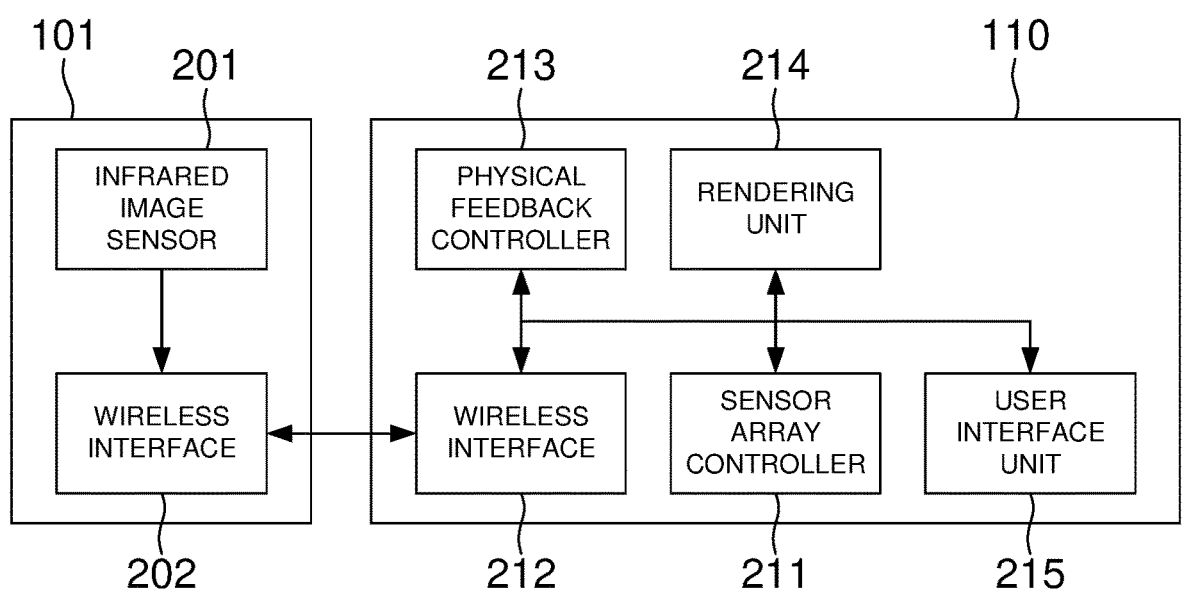
FIG. 2 illustrates the controller and an aerial vehicle of the system of FIG. 1, according to an embodiment of the present invention.
Figure 3:
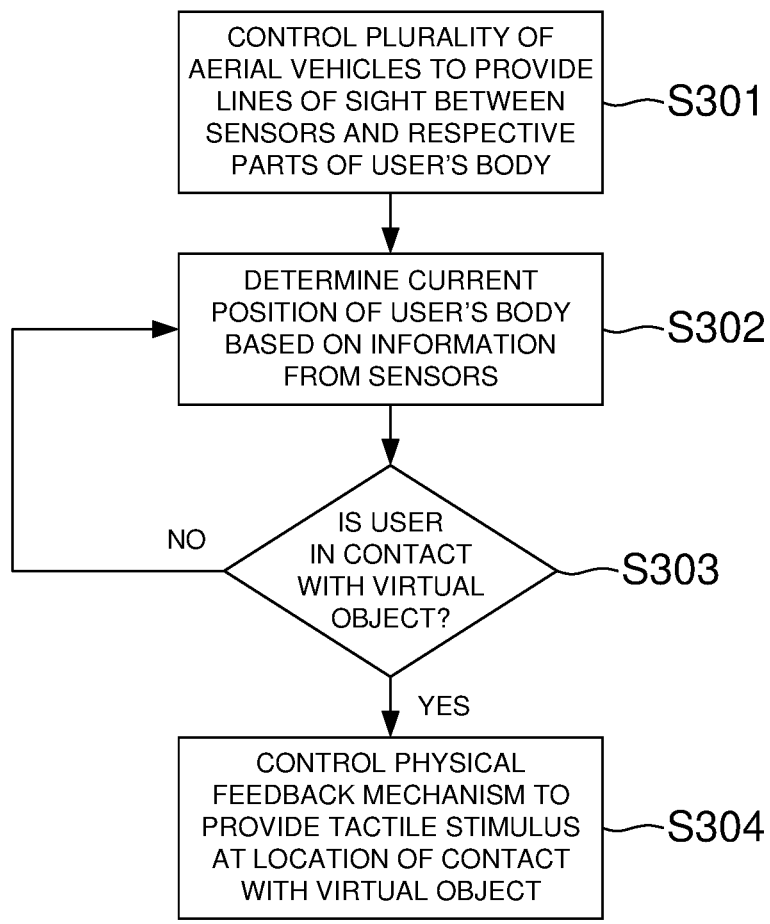
FIG. 3 is a flowchart showing a method of controlling the physical feedback mechanism of the system of FIG. 1 based on information obtained from the plurality of sensors, according to an embodiment of the present invention.

Referring now to FIGS. 1 to 3, a system is illustrated according to an embodiment of the present invention. The system comprises a sensor array comprising a plurality of sensors 201, a sensor array controller 110, a physical feedback mechanism 140 and a controller 110. Each sensor 201 is disposed on a respective one of a plurality of aerial vehicles 101, 102, 103, 104. The plurality of aerial vehicles 101, 102, 103, 104 can be arranged such that each sensor 201 is positioned so as to monitor a current position of a different part of the user's body 150. Using information obtained by the plurality of sensors 201, the controller 110 can determine a current position of the user's body 150, and control the physical feedback mechanism 140 to provide physical feedback to the user in dependence on the determined position of the user's body 150. For example, each sensor 201 may determine three-dimensional coordinates of one or more points on the user's body 150 relative to the current location of the sensor 201, and wirelessly transmit the determined coordinates to the controller 110 via suitable wireless interfaces 202, 212. The system may also comprise a suitable display, such as virtual reality headset 130, for displaying a virtual reality, augmented reality or mixed reality image to the user.

In some embodiments, the plurality of sensors 201 may comprise a plurality of cameras arranged to capture images of the user's body. For example, in some embodiments the controller 110 may apply a body recognition algorithm to one or more images captured by the plurality of cameras to determine the current position of the user's body 150. In another embodiment, the plurality of cameras may be infrared depth cameras capable of determining a distance between the camera and the user's body 150.

FIG. 2 is a block diagram illustrating functional elements of the controller 110 and an aerial vehicle 101 in the system of FIG. 1. As shown in FIG. 2, the controller 110 comprises a sensor array controller 211 configured to reposition the plurality of aerial vehicles 101, 102, 103, 104 so as to provide a line of sight between each one of the plurality of sensors 201 and a respective part of the user's body 150 monitored by said one of the plurality of sensors 201. In this way, the plurality of sensors can maintain their respective lines of sight, such that the controller 110 can accurately determine the current position of the user's body 150. For example, if the user moves their arm in such a way as to block the sensor array's view of their torso, the sensor controller 211 may reposition one or more of the plurality of aerial vehicles 101, 102, 103, 104 so that at least one of the sensors 201 has an unobstructed line of sight to the user's torso.

The sensor array controller 211 may control the plurality of aerial vehicles 101, 102, 103, 104 so as to form an array of sensors 201 that surrounds the user 150. Such an array may be referred to as a circumambient array. In some embodiments, the sensor array controller 211 may control the plurality of aerial vehicles 101, 102, 103, 104 so as to maintain a uniform spacing between adjacent ones of the aerial vehicles 101, 102, 103, 104, which may help to minimise the risk of collisions between aerial vehicles whilst also providing a clear view of the whole of the user's body 150. In some embodiments, the sensor array controller 211 may control the plurality of aerial vehicles 101, 102, 103, 104 to maintain a fixed distance to the user 150.

For example, if the user moves forward along the horizontal axis whilst rotating about the vertical axis, the sensor array controller 211 may control a circumambient array of the plurality of aerial vehicles 101, 102, 103, 104 to move in synchronicity with the user, by applying a similar rotation and forward movement to the circumambient array. Controlling the plurality of aerial vehicles 101, 102, 103, 104 in this way can allow the sensor array to maintain lines of sight to the different parts of the user's body 150.

In some embodiments the plurality of sensors 201 may be attached to the aerial vehicles 101, 102, 103, 104 in a fixed manner. In other embodiments one or more of the plurality of sensors 201 are moveably mounted to the respective ones of the plurality of aerial vehicles 101, 102, 103, 104, such that the sensor 201 can be reoriented independently of the aerial vehicle 101, 102, 103, 104 to which it is mounted. In such embodiments, the sensor array controller 211 can be configured to reorient one or more of the plurality of sensors 201 in addition to repositioning the plurality of aerial vehicles 101, 102, 103, 104, so as to provide the lines of sight between each one of the plurality of sensors 201 and a respective part of the user's body monitored by said one of the plurality of sensors 201. By enabling one or more of the sensors 201 to be reoriented independently of the aerial vehicle 101, 102, 103, 104 on which it is mounted, the number of degrees of freedom available to the sensor array controller 201 can be increased, and consequently the sensor array controller 201 can choose from more options when determining how to reconfigure the sensor array to maintain optimum imaging conditions.

Similarly, in some embodiments in which the plurality of sensors comprise imaging sensors, for example still or video cameras, the plurality of sensors may be configured to have variable focal lengths. This provides an additional degree of freedom to the sensor array controller 211, which can be configured to increase or decrease a focal length of one or more of the plurality of sensors 201 in addition to repositioning the plurality of aerial vehicles 101, 102, 103, 104, so as to provide a line of sight between each one of the plurality of sensors 201 and a respective part of the user's body monitored by said one of the plurality of sensors 201. In some embodiments, one or more of the sensors 201 may comprise an imaging sensor with variable focal length which is moveably mounted to one of the aerial vehicles 101, 102, 103, 104, further increasing the degrees of freedom available to the sensor array controller 211 when determining how to reconfigure the sensor array.

Similarly, in embodiments in which the sensor array comprises a head-mounted sensor worn on the user's head, such as a head-mounted camera, the head-mounted sensor may also be configured to be capable of being reoriented and/or having a focal length adjusted by the sensor array controller 211.

In some embodiments, the sensor array controller 211 may be configured to reconfigure the sensor array so as to enable the current position of the user's body 150 to be determined with a desired degree of accuracy. The desired degree of accuracy may be defined in various ways, for instance in terms of the angular size of the user's body 150 within the field of view of the sensors 201, or in terms of a desired resolution of the user's body 150 in images captured by the sensors 201. For example, in some embodiments the sensor array controller 211 may position one of the aerial vehicles 101, 102, 103, 104 so that the part of the user's body 150 that is currently being monitored by the sensor 201 on that aerial vehicle has at least a minimum angular size within the sensor's field of view. Consequently, if the angular size of that part of the user's body in the sensor's field of view changes for any reason, for example due to the user changing their position relative to the sensor 201 such that the sensor 201 now views the part of the user's body 150 at a relatively shallow angle, as opposed to a more head-on view, the sensor array controller 211 may reposition the aerial vehicle so as to increase the angular size of the part of the user's body 150 in the field of view of the sensor 201.

In another embodiment the sensor array controller 211 may attempt to position the aerial vehicles 101, 102, 103, 104 in such a way that the user's body 150 occupies at least a minimum area within an image frame captured by each sensor 201. In such embodiments the minimum area may be a variable threshold that differs for different ones of the sensors 201, since the area of the image occupied by the user's body 150 will be different depending on the position of the sensor 201, for example whether the sensor 201 is positioned above, in front of, behind, or to the side of the user. If the user changes their body position, for example if the user bends down, the sensor array controller 211 may reconfigure the sensor array so as to attempt to maintain the desired degree of accuracy, for example by repositioning ones of the aerial vehicles 101, 102, 103, 104 and/or by changing the orientation and/or focal length of one or more of the sensors 201.

The sensor array controller 211 may be configured to determine a number of the aerial vehicles 101, 102, 103, 104 that is required to determine the current position of the user's body with the desired degree of accuracy. Depending on the outcome of the determination, the required number of aerial vehicles may be equal to the number of aerial vehicles 101, 102, 103, 104 currently comprised in the sensor array, or may be greater than or lesser than the number of aerial vehicles 101, 102, 103, 104 currently comprised in the sensor array. In response to the determined number of aerial vehicles being less than the number of aerial vehicles currently comprised in the sensor array, the sensor array controller 211 may be configured to switch one or more redundant aerial vehicles into a standby mode in which said one or more redundant aerial vehicles do not form part of the sensor array. Here, the term "redundant aerial vehicle" refers to an aerial vehicle that is deemed surplus to requirements by the sensor array controller 211, in that the desired degree of accuracy can be obtained without requiring the sensor(s) on the redundant aerial vehicle(s). An aerial vehicle that is switched into the standby mode may land and power down so as to conserve power. In some embodiments, an aerial vehicle that is switched into the standby mode may automatically return to a charging station to begin charging an internal power source while in the standby mode.

If on the other hand the determined number of aerial vehicles is greater than the number of aerial vehicles 101, 102, 103, 104 currently comprised in the sensor array, the sensor array controller 211 can be configured to switch one or more aerial vehicles from the standby mode into an active mode in which said one or more aerial vehicles now form part of the sensor array. In this way, standby aerial vehicles may be swapped in and out of the sensor array as and when they are required. This can help to reduce power consumption by avoiding a situation in which more aerial vehicles are currently in use than are needed to provide the controller 110 with the desired degree of accuracy, in terms of the data that is provided by the sensor array.

In some embodiments of the present invention, the sensor array controller 211 may control the plurality of sensors 201 to monitor different parts of the user's body at different times. In this way, the parts of the user's body that are subject to monitoring by the plurality of sensors 201 can be changed by the sensor array controller 211 over time, for example depending on the mode of immersion (e.g. an autoscopic or a non-autoscopic mode of immersion) and the current point of view (POV) displayed to the user (e.g. whether a first-person POV or a third-person POV is used). As one example, when the system is operating in a first-person POV mode, the user's back will not be visible in the current field of view, and accordingly it may not be necessary for any of the plurality of sensors to maintain a line of sight to points on the user's back. This may still be true even when physical feedback is being applied to the part of the user's body 150 that is not currently visible to the user, for example their back. However, in some embodiments the plurality of sensors 201 may still be controlled to monitor one or more parts of the user's body 150 that are not currently visible to the user, for instance to enable more accurate motion tracking across the user's entire body, and/or to enable a calculation of a current or future point of contact between a virtual object and a part of the user's body that is not currently visible. In a scenario in which there are multiple such points of contact, for example depending on the size, shape and/or number of virtual objects, information from the plurality of sensors 201 may enable the determination of a plurality of points of contact between virtual object(s) and parts of the user's body, including parts that may or may not be visible to the user.

Conversely, when the system is operating in a third-person POV and part of the user's body 150 is being stimulated by the physical feedback mechanism 140, it may be possible for any part of the user's body to be in, or to enter, the user's field of view at any point in time. It will be appreciated that depending on the scenario, for example depending on the size, shape and/or number of virtual objects currently in contact with the user's body 150, one part or a plurality of parts of the user's body 150 may be stimulated by the physical feedback mechanism 140, so as to provide either a single stimulus or a plurality of stimuli. As such, when operating in the third-person POV the plurality of aerial vehicles 101, 102, 103, 104, 105 may be controlled to maintain lines of sight to all parts of the user's body 150 that are capable of being stimulated by the physical feedback mechanism 140, or to as much of the user's body 150 as is possible given the number of available sensors 201.

As a further example, in some embodiments the system may be configured to render the user's avatar in a transparent manner, such that parts of the avatar that would otherwise be occluded in an opaque rendering remain visible to the user at all times. For example, when the user's point of view is located behind the avatar and an opaque rendering is used, in some positions extremities such as the hand or arm of the avatar may be occluded by the torso of the avatar. However, when a transparent avatar is in the same position, the transparency means that the hand/arm remains visible through the torso. To give an example of a situation in which a transparent avatar may be used, in some embodiments an autoscopic mode of immersion can be provided by displaying the user's avatar as partially transparent, whilst applying a visual effect across a whole or part of the surface of the avatar that is synchronised with tactile stimulus. The visual and tactile feedback combine to create the illusion that the avatar is the user's own physical body as viewed from a third person POV and can therefore generate an autoscopic experience. Similarly, in some embodiments a transparent rendering mode may be used when operating in a first-person viewpoint, for example by rendering virtual representations of any parts of the user's body that are currently within the user's first-person field of view (e.g. hands, arms, legs etc.) in a transparent manner. The autoscopic mode of immersion is described in more detail later. Therefore in embodiments in which a transparent avatar is rendered and displayed to the user, the plurality of aerial vehicles 101, 102, 103, 104, 105 may be controlled to maintain lines of sight to all parts of the user's body 150 that are capable of being stimulated by the physical feedback mechanism 140.

On the other hand, in embodiments in which an opaque avatar is rendered and displayed to the user, the plurality of aerial vehicles 101, 102, 103, 104, 105 may be controlled to maintain lines of sight to parts of the user's body which are capable of being stimulated by the physical feedback mechanism and which are determined to be visible in the current field of view.

In the present embodiment the physical feedback mechanism 140 is embodied as a suit worn by the user 150. Here, the term "suit" is used to refer to a wearable item that may be configured to cover a significant portion of the user's body 150, up to and including the entirety of the body 150. In the present embodiment the suit 140 is configured to cover the torso, limbs and extremities, including the user's hands and feet. In this way, the physical feedback mechanism 140 can provide physical feedback across most or all of the user's body 150, providing a more immersive virtual or augmented reality experience. In other embodiments the physical feedback mechanism 140 may take a different form to that shown in FIG. 1. For example, in some embodiments the physical feedback mechanism 140 may comprise one or more physically separate modules each configured to be attached to a different part of the user's body 150, such as the torso, limbs, extremities, neck and/or head.

In some embodiments the physical feedback mechanism 140 may only be configured to provide physical feedback to a limited part of the user's body, for example, in some embodiments the physical feedback mechanism 140 may consist of a glove or a pair of gloves configured to provide physical feedback only to the user's hands. In such embodiments, the sensor array controller may control the plurality of aerial vehicles 101, 102, 103, 104, 105 to only maintain lines of sight to those parts of the user's body which are capable of being stimulated by the physical feedback mechanism, which in this example would be one or both hands.

The physical feedback mechanism 140 may include a tactile feedback mechanism capable of providing tactile stimulus to one or more regions of the user's body 150. For example, the tactile feedback mechanism may comprise a plurality of actuators capable of being controlled by the physical feedback controller 213 to deliver tactile stimulus to specific points or regions on the user's body 150. As explained above, it should be understood that in some scenarios a plurality of stimuli may be provided, and as such the singular form "stimulus" should not be interpreted as implying that only a single such stimulus is applied. The plurality of actuators may be electrically activated, and accordingly the stimulus that is generated may be referred to as "electro-tactile" stimulation. Depending on the embodiment, the plurality of actuators may be distributed evenly across the surface of the user's body 150, or the distribution may vary across the body 150. For example, in some embodiments a higher number of actuators may be provided in one or more regions of the human body that are known to have a high density of touch receptors relative to other regions of the body. The physical feedback controller 213 may control the plurality of actuators to deliver dynamic tactile stimulation to the user's body 150. Here, the term "dynamic" is used to denote tactile stimulation that is spatially and temporally differentiated, that is to say, that varies at different times and at different points in space. In some cases, synchronous stimulation may be applied simultaneously at multiple locations on the user's body. The intensity of the tactile stimulation at any given point may be constant or may vary over time.

The physical feedback mechanism 140 may include a kinaesthetic feedback mechanism capable of exerting a force on the body 150 so as to resist flexion and/or extension of the user's joints. Here, the term 'kinaesthetic' refers to a form of physical feedback that can be sensed by the user via proprioceptor organs that provide awareness of the position and movement of parts of the body. As such, the kinaesthetic feedback mechanism may also be referred to as a proprioception feedback mechanism.

In some embodiments, the physical feedback mechanism 140 may comprise both a tactile feedback mechanism and a kinaesthetic feedback mechanism. In some embodiments, the kinaesthetic feedback mechanism may be capable of forcibly moving parts of the user's body 150. The physical feedback controller 213 may control the kinaesthetic feedback mechanism so as to provide proprioceptive stimulus to the user, by applying external forces that affect the position and/or movement of the user's body 150. In this way, a more immersive user experience may be achieved by providing proprioceptive stimulus that complements and reinforces the stimuli received via the user's other senses, such as audio, visual and tactile stimulus. For example, if the user was to move their hand through and beyond the boundary of a virtual object, as displayed on a headset display 130, without encountering any physical resistance, the sense of immersion would be significantly diminished. In such a scenario, the physical feedback controller 213 can control the kinaesthetic feedback mechanism to resist movement of the user's body 150 through the boundary of a virtual object, providing a more immersive experience.

In some embodiments, a kinaesthetic feedback mechanism may comprise an exoskeleton comprising an assembly of struts connected by hinged joints. For example, an exoskeleton may be embedded within a suit 140 worn by the user, such as the one illustrated in FIG. 1, or may be worn externally to the suit 140. The exoskeleton may also comprise one or more actuators configured to apply a force to the struts on either side of a joint, so as to cause the joint to open or close. To avoid possible confusion, the actuators incorporated within the exoskeleton are hereinafter referred to as "joint actuators", whilst actuators incorporated within the tactile feedback mechanism are hereinafter referred to as "tactile actuators". Examples of suitable components for use as a joint actuator in a kinaesthetic feedback mechanism include, but are not limited to, motors, solenoids, artificial muscles such as electroactive polymers, and pneumatic or hydraulic cylinders. Examples of suitable components for use as tactile actuators in a tactile feedback mechanism include, but are not limited to, piezoelectric transducers and micromotors.

The kinaesthetic feedback mechanism may be capable of operating in various modes, such as an inactive mode, a passive resistance mode, and an exertive mode. In the inactive mode, the physical feedback controller 213 does not control the joint actuators to exert any force, such that the user is able to freely move without encountering resistance. For example, in an embodiment in which the joint actuators comprise electric motors, in the inactive mode the physical feedback controller 213 may disconnect all joint actuators from a power supply so that a spindle of each motor can freely rotate without exerting a resistive torque on the joint to which the motor is connected. In this way, the user is free to move whilst wearing the exoskeleton without being encumbered by resistance due to the presence of the joint actuators.

In the passive resistance mode, the physical feedback controller 213 controls one or more joint actuators to exert a force in response to a user's movement causing a joint in the exoskeleton to flex or extend. The forces exerted by the joint actuators in the passive resistance mode act to resist the user's own movements. For example, the force exerted by a joint actuator in the passive resistance mode may be in an opposite direction to the force exerted by the user, or may be in any other non-complimentary direction, that is, any direction that differs from the direction of the force exerted by the user. As a further example, in some scenarios a joint actuator may be controlled to exert a braking force on a joint of the exoskeleton such that the exoskeleton resists the user's movements. The passive resistance mode may also be referred to as a 'subordinate' control mode, since the user perceives the movement of the exoskeleton to be subordinate to their own movements, albeit whilst applying some level of resistance.

In the exertive mode, the physical feedback controller 213 controls one or more joint actuators to exert a sufficient force to cause a joint in the exoskeleton to flex or extend, overriding the user's own efforts to move the joint. A joint actuator may be configured to produce various types of movement of the adjoined limbs, including but not limited to abduction/adduction, pronation/supination, rotation and circumduction. The maximum force that can be exerted by a joint actuator may be limited, so as to avoid causing injury. The exertive mode may also be referred to as an 'insubordinate' control mode, since the user perceives the exoskeleton as behaving in a manner that is beyond their control, i.e. insubordinate to the user's own movements. The physical feedback controller 213 may switch between the inactive, passive resistance or exertive modes according to the current situation, for example, depending on whether the user is currently deemed to be in contact with a virtual object or any other virtual surface.

Furthermore, it will be appreciated that the distinction between the passive resistance mode and the exertive mode depends upon the relationship between the forces exerted by the joint actuators and the forces exerted by the user. In some situations, the user may perceive a transition from the exertive mode to the passive resistance mode, or vice versa, as a result of changing their own behaviour (e.g. their direction of movement and magnitude of forces exerted). For example, in one embodiment the exoskeleton may be controlled in the exertive mode to repeatedly execute a dance movement, for instance as a training aid to help the user to learn a new dance routine. In this example, as the user gains proficiency and learns the sequence of movements, they may reach a point at which their own movement trajectories become synchronised with the forced movements of the exoskeleton, and as such may perceive the exoskeleton's movements as changing from insubordinate to subordinate, even though the joint actuators may still be controlled in the same way as before.

In some embodiments, in the exertive or the passive resistance mode the physical feedback controller 213 may control a plurality of joint actuators at adjoining sections of the exoskeleton to exert a force on the respective joints, depending upon the magnitude of the counterforce deemed to be exerted by a virtual object. To simulate the force exerted on a user's body 150 by a virtual object, the joint actuator closest to the point of contact between the virtual object and the user's body 150 may be controlled to exert a corresponding counterforce on that joint. At the same time, one or more joint actuators at adjoining sections of the exoskeleton can be controlled to exert forces on the respective joints between adjoining sections, so as to simulate the distributional effect of exerted counterforces upon distal segments of the user's body 150. In this way, the system can provide a more realistic simulation of the forces experienced when interacting with real physical objections, enabling a user to interact with virtual objects in a more convincing and immersive manner.

For example, when a user picks up a virtual object, the physical feedback controller 213 may control joint actuators at the wrist and/or finger joints to exert a counterforce to simulate the weight of the virtual object in the user's hand. At the same time, the physical feedback controller 213 may control joint actuators in adjoining sections of the exoskeleton, such as the forearm, elbow, upper arm, shoulder, and so on, to simulate the effect of distributed counterforces exerted upon the user's body 150 as a result of lifting the virtual object. Furthermore, the physical feedback controller 213 may be capable of simultaneously providing feedback to simulate a plurality of separate events, such as a user picking up a virtual object with one hand whilst holding another virtual object in the other hand. In this example, the forces exerted on one arm by the exoskeleton may be independent of the forces exerted on the other arm by the exoskeleton, whilst the forces exerted on the torso may take into account the influence of both virtual objects.

In some embodiments, the physical feedback mechanism can be configured to exert a variable resistance to the user's movements in dependence on control signals received from the physical feedback controller 213, through other means than the joint actuators described above. For example, in embodiments in which the physical feedback mechanism is embodied as an exoskeleton comprising a plurality of exoskeleton members, the plurality of exoskeleton members can include one or more adaptive members that are configured to have a controllable bending stiffness. In other words, an adaptive exoskeleton member can be rendered more or less flexible in dependence on control signals received from the physical feedback controller 213, such that the part of the exoskeleton frame in which the adaptive member presents a lesser or greater resistance to the user's own body movements. For example, an adaptive exoskeleton member may comprise a material such as an electroactive polymer.

The physical feedback controller 213 may continuously recalculate the forces exerted on the user's body by a virtual object as a user interacts with the object, and adjust the forces exerted by the joint actuators accordingly. For example, if a user pushes against a virtual object and then breaks contact with the object, the forces involved may change significantly over time. In some embodiments, the physical feedback controller 213 may control a kinaesthetic feedback mechanism and a tactile feedback mechanism to provide both tactile stimulus and proprioceptive stimulus, thereby providing a more realistic simulation. Tactile stimulus refers to stimulus that can be detected by touch receptors within the user's body, whereas proprioceptive (also referred to as kinaesthetic) stimulus refers to stimulus that can be detected by proprioceptors within the user's body. Tactile stimulus and proprioceptive stimulus are both examples of different types of physical feedback.

In some embodiments, the system may further comprise a user arousal sensor for monitoring the user's current level of alertness, which in psychology is referred to as arousal. The controller may be configured to adapt an intensity level of the proprioceptive and/or tactile stimulus according to the user's current level of arousal, as determined by the user arousal sensor. The sensor, controller and physical feedback mechanism together form a biofeedback loop which can autonomously regulate the amount of proprioceptive and/or tactile feedback provided to the user.

In some embodiments the tactile feedback mechanism may be capable of generating proprioceptive stimulus, instead of or in addition to the proprioceptive stimulus generated by a kinaesthetic feedback mechanism. For example, tactile actuators in a tactile feedback mechanism may be controlled to generate mild levels of kinaesthetic resistance/holding, and joint actuators in a kinaesthetic feedback mechanism may be controlled to generate stronger levels of kinaesthetic resistance and/or the forced repositioning of the user's body 150.

The forced feedback mechanism may additionally comprise one or more joint position sensors configured to detect a current position of the struts on either side of the joint. In such embodiments, the controller 110 may receive information from each joint position sensor that is indicative of the current positions of the struts on either side of the joint, so as to enable the controller 110 to determine a current position of the exoskeleton, and by implication the current position of the user's body 150. Such information can indicate the current angle of some or all joints in the user's body 150, but does not convey information about the position and shape of the surface of the user's body 150 between the joints. Accordingly, the information obtained from the joint position sensor may be referred to as "low-resolution position information", whilst the information obtained from the plurality of sensors 201 mounted on the aerial vehicles 101, 102, 103, 104 may be referred to as "high-resolution position information". The controller 110 may be configured to take into account both the low-resolution position information from the joint sensors and the high-resolution position information from the aerial vehicle sensors when determining the current position of the user's body, to improve the accuracy.

For example, in some embodiments the aerial vehicles 101, 102, 103, 104 may not be permitted to enter the user's peripersonal space, so as to avoid the risk of a vehicle colliding with the user. Due to this restriction on movement of the aerial vehicles 101, 102, 103, 104, a situation may still arise in which part of the user's body remains obscured to all of the sensors in the sensor array. In such a situation, the part of the user's body that is obscured to all of the sensors may be referred to as an "occluded part" or an "occluded surface". The controller 110 may augment the high-resolution position information from the sensor array with low-resolution position information for the part of the user's body that is currently not visible to the sensor array, to provide more complete information about the user's current position.

Furthermore, the low-resolution position information may capture information that is not included in the high-resolution position information, and vice versa. For example, the aerial vehicle sensors may be capable of capturing fine detail such as muscular movement and the bending of limbs/tissue between joints of the exoskeleton, which cannot be determined from the exoskeleton sensor information alone (i.e. the low-resolution position information). On the other hand, the joint sensors in the exoskeleton may be capable of measuring a force exerted by the user, which cannot be determined directly from the aerial vehicle sensor data (i.e. the high-resolution position information). In some embodiments the physical feedback mechanism may comprise one or more pressure sensors disposed so as to measure a pressure exerted by the user at locations between joints. Such pressure sensors can provide additional information in relation to the force that the user is applying to the virtual object, and can allow the direction and/or magnitude of any forces exerted by the user to be determined with greater accuracy.

The physical feedback may be synchronised with a virtual reality, augmented reality or mixed reality image that is displayed to the user, to provide a more convincing and more immersive user experience. For example, the system may comprise a display device such as a headset 130 for displaying virtual reality, augmented reality or mixed reality images to the user.

In the embodiment illustrated in FIG. 1, the system comprises a display in the form of a headset 130. The controller 110 comprises a rendering unit 214 which can render a virtual reality, augmented reality or mixed reality image and send the rendered image to the display 130 for presentation to the user. The headset 130 may comprise a sensor for detecting a current orientation of the user's head, for example a gyroscope and/or electronic compass, which can transmit information about the user's physical angle of view to the controller 110. This information can be utilised by the rendering unit 214 when rendering the virtual reality, augmented reality or mixed reality image. The rendering unit 214 may render the image from a first-person perspective or a third-person perspective. The first-person perspective may also be referred to as an egocentric perspective, and the third-person perspective may also be referred to as an allocentric perspective.

In a first-person mode, a rendered virtual-reality image may include a virtual representation of a part of the user's body that is within the user's current field of view, as determined based on the current position of the user's body 150 and the direction in which the user is looking. As described above, the controller 110 can use the array of sensors 201 to accurately determine the current position of the user's body 150. In some embodiments, the accuracy of the determination may be further improved by also taking into account information about the angles of joints in an exoskeleton worn by the user, based on information received from one or more joint position sensors, and/or by taking into account information about the current angle of the user's head, based on information received from a gyroscope or other suitable sensor in a headset 130 worn by the user. In this way, the system can accurately determine the current position of the user's body 150 and therefore render a virtual representation of part of the user's body 150 that is currently in view which more closely matches the user's own proprioceptive perception of their body position, thereby providing a more convincing and immersive experience.

Additionally, in some embodiments the headset may comprise an image sensor arranged so as to capture images with a similar field of view to the user's current view. The image sensor may, for example, be an infrared depth camera or sensor. In some embodiments, the image sensor may be positioned in or on the headset in a fixed manner, such that the camera points in a fixed direction relative to the headset. In other embodiments, the headset may further comprise a camera positioning mechanism for automatically repositioning the camera according to a user's eye movements, so that the camera points in a direction of the user's gaze. For example, an eye tracking sensor may be used to determine the current gaze direction of the user, and the camera positioning mechanism can be automatically controlled to reposition the headset-mounted camera to point in the same direction as the user's gaze.

In some embodiments, one of the plurality of aerial vehicles may be positioned such that the sensor mounted on the aerial vehicle is anterior to, and directed towards, a point in space which is the current focus of the user's attention. This is the focus point that is conferred by binocular vision, which is hereinafter referred to as the 'gaze point'. The gaze point may alternatively be referred to as the 'point of regard', since this is the point that is currently the focus of the user's attention, or may be referred to as the 'stereoscopic focal point'. In this way, data provided by the sensor can be used to accurately determine the current position of parts of the body that are within the user's current field of view.

The aerial vehicle may be positioned such that the sensor mounted on the aerial vehicle has a line of sight which is inverse to the user's current line of sight, that is to say, such that the sensor is directed along the user's line of sight in the opposite direction to that of the user's gaze. In this way, an image captured by the sensor in effect corresponds to the inverse of the user's current field of view. Furthermore, in some embodiments, if part of the user's body is obscured from the sensor directed along the inverse line to the user's current line of sight, another one of the plurality of aerial vehicles may be positioned in such a way as to image the obscured body part. Alternatively, or additionally, the position of the obscured body part may be determined based on low-resolution position information as described above, for example using data received from one or more joint sensors in an exoskeleton worn by the user.

Furthermore, the user's own field of view will change over time in dependence on the user's head and eye movements. In some embodiments the system may further comprise an eye tracking sensor configured to track the user's eye movements and determine the current direction of the user's gaze. The gaze point can then be determined based on the current direction of the user's gaze. In other embodiments an eye tracking sensor may be omitted, and the gaze point may simply be assumed to be a point at a certain distance from the user along the mid-sagittal plane of the user's head.

The eye tracking sensor may, for example, be mounted on the headset. Alternatively, the eye tracking sensor may be mounted elsewhere. For example, in an augmented reality embodiment the headset may comprise transparent eyepieces onto which an augmented reality image may be projected, in a similar manner to a heads-up display. In such embodiments, the user's eyes may still be visible from an external perspective even when the user is wearing the headset, and as such the eye tracking sensor may be disposed on one of the aerial vehicles. For example, an eye tracking sensor may comprise an image sensor disposed so as to capture an image of the user's eye, and an image processing algorithm may be configured to process the captured image to determine the current direction of the user's gaze.

Real-time tracking of the user's body position via the sensors mounted on the aerial vehicles may therefore be complemented by information gathered using other sensors, such as an eye tracking sensor, headset-mounted orientation sensor and/or headset-mounted image sensor, further increasing the accuracy with which the user's current body position and gaze direction can be determined.

As described above, the controller may control one of the plurality of aerial vehicles to adopt a position that is anterior to, and directed towards, the gaze point, to ensure accurate tracking of body parts that are currently within the user's field of view. The aerial vehicle that is directed towards the gaze point may be designated as a 'master', and other ones of the aerial vehicles may be designated as 'slaves', with the positions of the slave aerial vehicles being set relative to the current location of the master aerial vehicle.

In some embodiments, in addition to repositioning one of the aerial vehicles to be positioned anterior to, and directed towards, the gaze point, the system may comprise a headset-mounted camera and a camera positioning mechanism as described above. In some embodiments in which a headset-mounted sensor is provided, as described above, when the system is operating in a first-person mode the headset-mounted sensor may be designated as the 'master', and the plurality of aerial vehicles may each be designated as 'slaves'. In such embodiments, the positions of the slave aerial vehicles are set relative to the current location and orientation of the headset-mounted sensor. In this case, the aerial vehicle that is positioned to have a sensor line of sight that is inverse to that of the user is considered to be a slave, since the headset-mounted sensor acts as the master. In this way, the headset-mounted camera and the aerial vehicle can both be automatically repositioned in response to the user's eye movements as detected by the eye tracking sensor.

Furthermore, it is possible that the gaze point may deviate significantly from the mid-sagittal plane of the user's head, for example when the user adjusts their gaze far to the left or far to the right by eye movement alone, without commensurate head movement. In such a scenario, a more accurate determination of the current gaze point can be obtained by taking into account information from an eye tracking sensor.

In some embodiments, the controller may reposition the master aerial vehicle if the location of the gaze point deviates from the previous location of the gaze point by more than a certain amount. In more detail, if the controller determines that the gaze point has moved away from the previous gaze point by more than a threshold distance, the controller may control the master aerial vehicle that was directed towards the previous gaze point to move to a suitable new position according to the current gaze point. In this way, accurate tracking of body parts within the user's field of view can be maintained. The controller may also control the slave aerial vehicles to reposition themselves relative to the master aerial vehicle when the master is moved to a new position.

In a third-person mode, the rendering unit 214 may render an image of a 3D avatar (a virtual representation of a figure corresponding to a user's body) which corresponds to the determined current position of the user's body 150. The avatar may be rendered in a semi-transparent manner to allow the user to view objects on the opposite side of the avatar to the current viewpoint.

In some embodiments, the system can be used to induce an autoscopic experience in which the user perceives the environment from a perspective outside of their own body. In some types of autoscopic experience, the user perceives their body to be somewhere other than its actual location, and accordingly such types of autoscopic experience may be referred to as an 'out-of-body' experience. In this type of autoscopic experience, the user's sense of bodily unity is disrupted, such that they perceive themselves to be in a different location to their physical body. However, in a more general sense, the term 'autoscopy' may refer to the perception of any form of bodily relocation/projection with or without the preservation of bodily unity.

Embodiments of the present invention may be configured to produce an autoscopic experience by providing a combination of visual and tactile feedback which is spatially and temporally isomorphic. An autoscopic experience may be generated in a first-person mode or in a third-person mode by appropriate control of the physical feedback, in synchronisation with a visual rendering of part of the user's body displayed on the headset. Furthermore, by using an array of sensors 201 with clear lines of sight to the user's body 150, as described above, the system can accurately determine the current position of the user's body 150 and therefore produce a more immersive autoscopic experience, by rendering an image of an avatar that more closely corresponds to the user's current body position and orientation.

In more detail, in some embodiments the system may be configured to be operable in a third-person autoscopic mode in which the user's avatar is displayed as partially transparent. A visual effect that is spatially and temporally varying can be applied across a surface of the avatar, for example as a visually discernible alternation of colour and/or brightness. The visual effect may be globally distributed across the surface of the avatar, giving a spatially varying 'shimmering' appearance. At the same time as displaying the visual effect, the tactile feedback mechanism can be used to provide the user with tactile stimulus which is spatially and temporally isomorphic to the visual effect applied to the avatar. In other words, the visual and tactile stimulus can be synchronised with each other. Since the user is viewing the avatar from a third-person perspective, whilst the visual and tactile feedback reinforce the impression that the avatar is their own physical body, an autoscopic experience can be generated. Furthermore, by applying a visual effect across the surface of the avatar together with synchronised tactile stimulus across the user's body, an autoscopic experience can be generated and sustained irrespective of whether the user is making contact with any parts of the virtual environment or with any virtual objects within the environment, and irrespective of whether the user is currently mobile or stationary.

In the third-person autoscopic mode, the array of aerial vehicles can be controlled to maintain a distal (i.e. whole-body) view of the user, for example from a posterior profile such that the user views their avatar from behind. The spatial position of the autoscopic visual effect and synchronised tactile stimulus can be continually updated so as to match the user's movements, further reinforcing the belief that the third-person avatar being observed is the user's own body.

In some embodiments, a similar approach may be used to generate an autoscopic experience while the system is operating in a first-person autoscopic mode. Even though a first-person mode is used, the user may still be able to observe virtual representations of parts of their own body, for example by tilting their head downwards or raising their hands in front of their face. In such situations, parts of the user's body within their current field of view can be rendered in a semi-transparent manner similar to the third-person avatar described above, with a similar visual effect and synchronised tactile stimulus being applied to the corresponding part of the user's body via the tactile feedback mechanism.

As an alternative to the autoscopic modes described above, in some embodiments the system may be configured to operate in a so-called telepresent mode. In some embodiments the system may be switchable between autoscopic and telepresent modes. The telepresent mode is similar to a conventional virtual reality mode, insofar as the virtual representation of parts of the user's body that are currently within the field of view match the size, shape and position of the user's actual corresponding body parts. In the telepresent mode, parts of the avatar that are within the current field of view may be rendered opaquely, so as to block the user's view of objects or other body parts occluded by part of the avatar. Physical feedback, such as proprioceptive and/or tactile stimulus, can be provided commensurately with points of contact between the user's body and virtual objects, providing an immersive virtual experience.

As a further example, in some embodiments the system may be configured to display a sectional intersection of the user's third-person avatar within a first-person perspective. In other words, part of the third-person avatar can be displayed as if the user was viewing the avatar from a different position within the body, as opposed to viewing the avatar from a viewpoint outside of the body as in a conventional third-person mode. The user can therefore perceive the third-person avatar as a prolongation of their own body as perceived from a first-person point of view, and accordingly this type of operating mode will hereinafter be referred to as a 'prolongated perspectivisation' mode.

In the prolongated perspectivisation mode, the controller may determine the user's current viewpoint based on information received from a headset-mounted orientation sensor such as a gyroscope, whilst a sectional intersection of the third-person avatar can be rendered and displayed by the controller based on information received from the sensors mounted on the array of aerial vehicles. In some embodiments, two distinct arrays of aerial vehicles and sensors may be used to capture information for use by the controller in rendering the sectional view of the third-person avatar. A first sensor array can be used to capture real-time kinematics for use in rendering the sectional representation of the third-person avatar, by positioning a first master aerial vehicle using coordinates obtained from a positioning sensor (e.g. GPS receiver) worn on the user's body. A second sensor array can be used to capture information for determining the current field of view from a first-person perspective, including the position of any parts of the user's body within the current field of view, by positioning a second master aerial vehicle at the current gaze point, as described above.

In the prolongated perspectivisation mode, the sectional view of the third-person avatar can be changed by moving the aerial vehicles of the first sensor array. For example, the aerial vehicles in the first sensor array can be moved closer to or further from the user, to zoom or crop the area of the user's body that is rendered as a sectional view of the third-person avatar. Accordingly, autoscopic profiles may be set for a plurality of users in which parameters such as: the distance between the aerial vehicles in the first sensor array and the user, and thus the displayed avatar area; the distance of superimposition upon/from the user's first-person vantage point; and the intersection depth with regard to the plane of presentation, are customised for each user so as to establish optimal autoscopic profiles on an individual user basis.

Furthermore, the use of autoscopic profiles is not restricted to the prolongated perspectivisation mode. In embodiments of the present invention user-specific autoscopic profiles can be created, stored and updated for other types of operating modes. Examples of parameters which can be stored in an autoscopic profile include, but are not limited to, the frequency and/or amplitude of concurrent visual and tactile feedback for producing an autoscopic effect, and/or an optimal spatial-temporal pattern of concurrent visual and tactile feedback for the current user. For example, research has shown that intermittently increasing the rhythm of stimulation applied to a user can generate a more intense autoscopic experience. By providing user-specific autoscopic profiles, the depth of autoscopisis experienced by the user may be improved, and the time taken to initiate the autoscopic experience, referred to as the onset latency, may be decreased.

Figure 4:
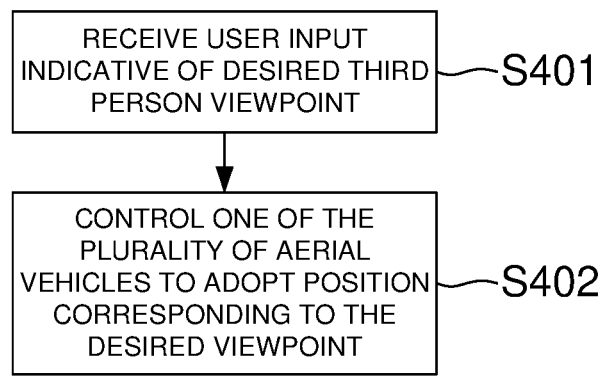
FIG. 4 is a flowchart showing a method of rendering a third person representation of the user from a user-selected viewpoint, according to an embodiment of the present invention.

FIG. 4 illustrates a flowchart showing a method of rendering a third person representation of the user from a user-selected viewpoint, according to an embodiment of the present invention. The third-person representation may be referred to as the user's avatar. For example, the method shown in FIG. 4 may be used when rendering the avatar in a third-person autoscopic mode as described above, or may be used in a 'normal' (i.e. non-autoscopic) third-person mode.

First, in step S401 the system receives user input indicative of a desired viewpoint of the third-person perspective view, via the user interface. The user interface allows the user to select different viewpoints, for example by selecting one of a plurality of discrete predefined viewpoints or by moving a virtual camera to an arbitrary position relative to the avatar. Then, in step S402 the sensor array controller controls one of the plurality of aerial vehicles to adopt a position corresponding to the user's desired viewpoint. In this way, the aerial vehicle positioned at the desired viewpoint can capture information about the user's current body position from the same position relative to the user's body as the current viewpoint relative to the avatar, and so a more accurate avatar can be generated and displayed.

Furthermore, in some embodiments in step S402 the sensor array controller may also control other ones of the aerial vehicles to reposition themselves relative to the sensor at the user's current viewpoint. For example, in one embodiment an array of sensors mounted on four aerial vehicles may be controlled to capture data from four vantage points concurrently.

In some embodiments, the user interface may be configured to allow the user to select one of a plurality of third-person viewpoints corresponding to the current locations of the individual aerial vehicles in the sensor array. Taking the example of a system comprising an array of four aerial vehicles, the third-person profile by which the avatar is subsequently displayed may correspond to any one of the four aerial vehicle vantage points. The aerial vehicles may, for example, be controlled to maintain fixed positions across the frontal and sagittal planes as the user moves. In addition, in some embodiments the sensor array controller may control the aerial vehicle array to maintain an equidistant configuration, meaning that all of the aerial vehicles are positioned at the same distance from the user's body. The sensor array controller may then control the aerial vehicle sensor array to rotate about the user in three dimensions in accordance with movement of a virtual camera about the third-person avatar, including pitch, roll and yaw rotations. This affords the deployment of alternatively configured vantage points and locomotively varying perspectives upon the user (e.g. panning, circling, tilting). Accordingly, the rotating vantage point is afforded a constant focal distance upon the freely moving user. These sensor array reconfigurations, such as rotations, can be automatically performed as pre-programmed routines of context dependent cues/events, or can be selected by the user from a menu of pre-programmed routines, or can be performed under full manual user control, allowing arbitrary reconfiguration of the sensor array.

Figure 5:
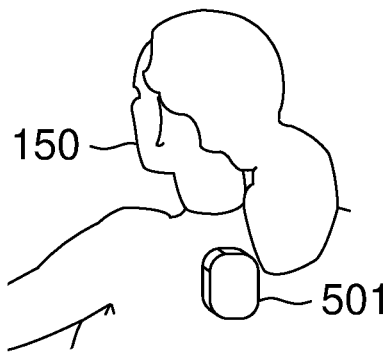
FIG. 5 illustrates a positioning unit for determining coordinates of a point on a user's body, according to an embodiment of the present invention.

A method of controlling the plurality of aerial vehicles using coordinates of a positioning unit disposed on the user's body will now be described with reference to FIGS. 5 and 6, according to an embodiment of the present invention. FIG. 5 illustrates a positioning unit for determining coordinates of a point on a user's body, and FIG. 6 is a flowchart showing a method of controlling the plurality of aerial vehicles to avoid contact with the user's body.

In the embodiment shown in FIG. 5, a positioning unit is included in the upper mid-point at the rear of the suit (i.e. between the lower portion of the shoulders). In other embodiments the positioning unit could be located elsewhere on the user's body. In some embodiments the positioning unit may be configured to be detached and reattached at different locations on the user's body, for example according to whether the system is operating with the sensor array in a first-person configuration or in a third-person configuration. Furthermore, in some embodiments a plurality of positioning units may be disposed at different locations on the user's body.

The positioning unit may be a global navigation satellite system (GNSS) receiver, such as a Global Positioning System (GPS) receiver. The sensor array controller is configured to control each one of the plurality of aerial vehicles to maintain a set position in three-dimensional space relative to the determined coordinates. Using a GNSS positioning unit permits the master aerial vehicle to assume any position relative to the determined GNSS coordinates, irrespective of whether a line of sight between the positioning unit and the master aerial vehicle becomes occluded by part of the user's body or any other object. Furthermore, any slave aerial vehicles included in the sensor array may be controlled to adopt equidistant positions relative to the determined GNSS coordinates.

Figure 6:
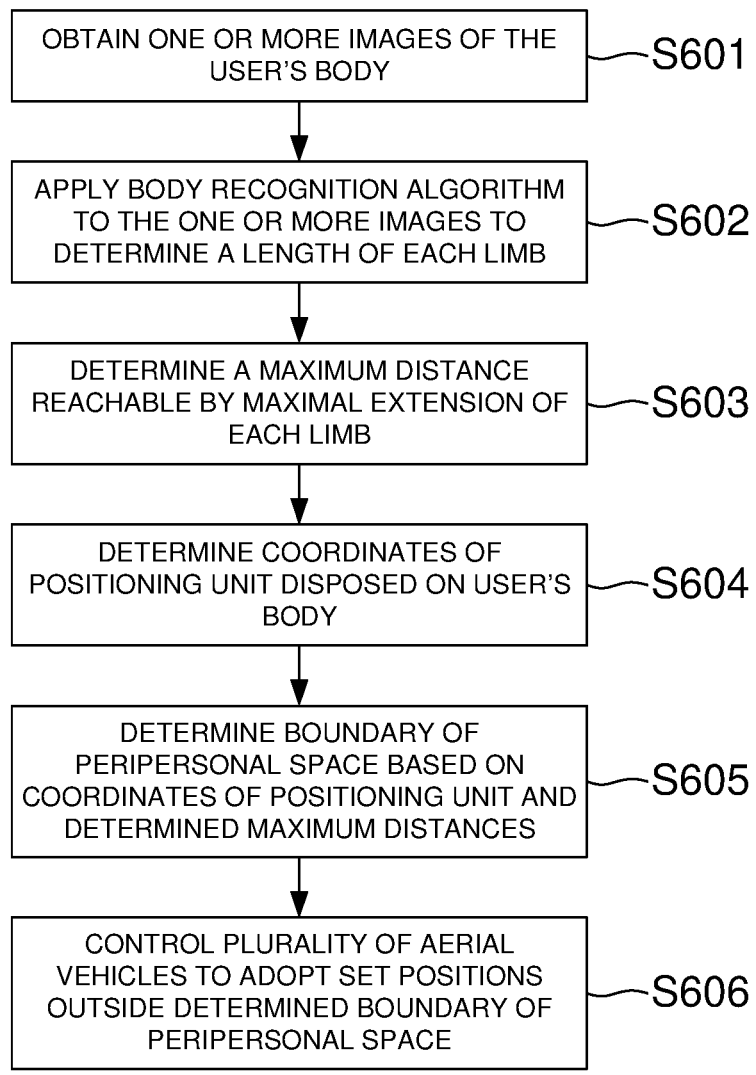
FIG. 6 is a flowchart showing a method of controlling the plurality of aerial vehicles to avoid contact with the user's body, according to an embodiment of the present invention.

The method shown in FIG. 6 can allow the sensor array controller to ensure that the aerial vehicles maintain a safe separation distance to the user, to reduce the risk of collisions between the user and the aerial vehicles. First, in step S601 the controller 110 obtains one or more images of the users' body from the sensors. Then, in step S602 the controller 110 applies a body recognition algorithm to the obtained images to determine the lengths of the user's limbs, and in step S603 the controller 110 uses this information to calculate the maximum distance that each limb can reach from the location of the positioning unit 501. Next, in step S604 the sensor array controller 211 obtains the current coordinates (e.g. GPS coordinates) of the positioning unit 501. In step S605 the sensor array controller 211 determines the extent of the user's peripersonal space, meaning the space within which the user can interact physically with their environment, based on the known location of the positioning unit and the maximum distances that can be reached by the user's limbs. Finally, in step S604 the sensor array controller 211 controls the plurality of aerial vehicles to adopt positions that are at least the determined minimum distance away from the positioning unit.

Figure 7:
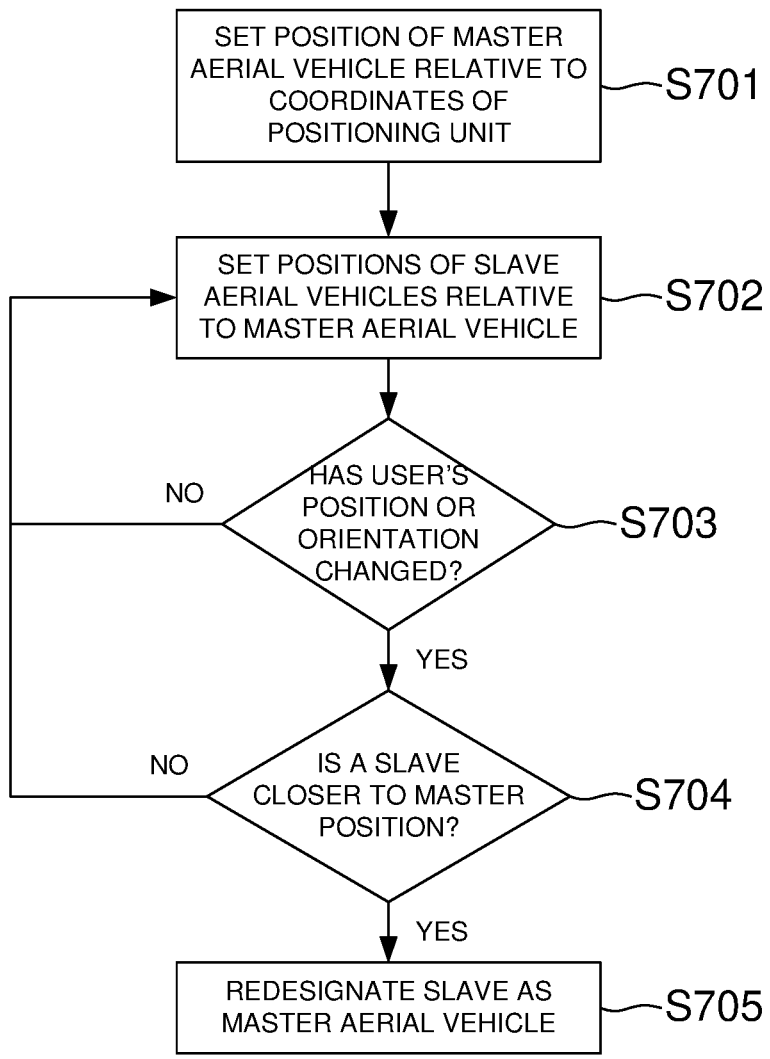
FIG. 7 is a flowchart showing a method of designating each of the plurality of aerial vehicles as a master or a slave, according to an embodiment of the present invention.

Referring now to FIG. 7, a flowchart is illustrated showing a method of designating each of the plurality of aerial vehicles as a master or a slave, according to an embodiment of the present invention. As described above, in some embodiments the plurality of aerial vehicles in the sensor array may be organised into a master aerial vehicle and one or more slave aerial vehicles. The method shown in FIG. 7 can be used to automatically reassign the 'master' role according to the user's movements.

Firstly, in step S701 the sensor array controller 211 is configured to set the position for the master aerial vehicle relative to the determined coordinates of the positioning unit 501. Then, in step S702 the sensor array controller 211 sets a respective position for each of the one or more slave aerial vehicles relative to the position of the master aerial vehicle. The sensor array controller 211 may then monitor the user's movements in step S703 to check whether the user's position or orientation has changed since the master and slave positions were assigned.

If it is determined in step S703 that the user's position and/or orientation has changed, then in step S704 the sensor array controller 211 checks whether one of the slave vehicles is now closer to the set position for the master than the actual master vehicle. If it is determined that one of the slave vehicles is now closer to the set position for the master, then in step S705 the sensor array controller 211 designates that slave vehicle as a new master, and designates the old master as a slave. This approach avoids having to relocate the master and slave vehicles due to sudden large movements made by the user.

In some embodiments, in step S704 the sensor array controller 211 may take other factors into account instead of, or in addition to, the distances between the slave and master vehicles and the new position that has been set for the master vehicle. For example, in some embodiments in step S704 the sensor array controller 211 is configured to determine whether a predicted time for the current master aerial vehicle to move from its current location to the set position for the master aerial vehicle will exceed a time limit. It will be appreciated that the predicted time will depend in part on the distance between the current location of the master vehicle and the new position that has been set for the master vehicle, but will also depend on other factors, such as the current speed and direction of travel of the master aerial vehicle (i.e. the current velocity of the master aerial vehicle), the maximum speed at which the master aerial vehicle can travel, and a path that the master aerial vehicle must take to reach the new set position, which may depend on whether any obstacles are present between the current location of the master aerial vehicle and the new set position.

The time limit may be a fixed (i.e. predefined) time limit, or may be a variable time limit. For example, in some embodiments the time limit may be a variable time limit that is set by the sensor array controller 211 depending on the user's current speed of movement, such that a shorter time limit is set when the user is moving more quickly. In some embodiments the time limit may be a variable time limit that is set by the sensor array controller 211 depending on the shortest time that would be taken for one of the slave aerial vehicles to reach the new set position for the master aerial vehicle.

In response to a determination that the predicted time does not exceed the time limit, the sensor array controller 211 may keep the existing master/slave designations, and may control the master aerial vehicle to move from its current location to the set position for the master aerial vehicle. On the other hand, in response to a determination that the predicted time exceeds the time limit, the sensor array controller 211 may proceed to step S705 and designate one of the slave aerial vehicles as the master aerial vehicle, by designating the slave aerial vehicle that is predicted to be able to reach the new set master position in the shortest time amongst all of the aerial vehicles.

Furthermore, in embodiments in which some or all of the sensors 201 are capable of being reoriented independently of the aerial vehicle, and/or having their focal lengths adjusted, the sensor array controller 211 may also choose to reorient and/or change the focal length of one or more of the sensors in steps S701 and S702. Similarly, in embodiments in which the sensor array comprises a head-mounted sensor configured to be worn on the user's head, such as an imaging sensor arranged so as to capture an image indicative of the user's current field of view, in steps S701 and S702 the sensor array controller 211 may choose to change an orientation and/or adjust a focal length of the head-mounted sensor. Such reorientation and/or focal length adjustment may take place instead of, or as well as, setting new positions of the aerial vehicles in steps S701 and S702.

Figure 8:
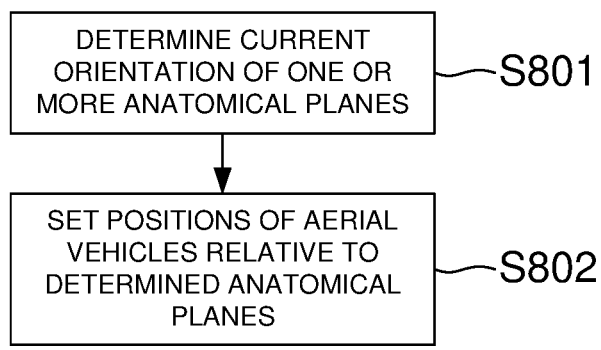
FIG. 8 is a flowchart showing a method of setting the positions of the plurality of aerial vehicles relative to anatomical planes of the user's body, according to an embodiment of the present invention.

Referring now to FIG. 8, a flowchart is illustrated showing a method of setting the positions of the plurality of aerial vehicles relative to anatomical planes of the user's body, according to an embodiment of the present invention.

First, in step S801 the sensor array controller 211 determines a current orientation in space of one or more anatomical planes of the user's body, such as the frontal plane, sagittal plane, and transverse plane. The sensor array controller 211 may identify the anatomical planes based on information obtained using the plurality of sensors, for example by analysing images captured using infra-red depth cameras mounted on the aerial vehicles. In some embodiments the sensor array controller 211 may determine the current orientation in space of said one or more anatomical planes based on the determined coordinates of the positioning unit. In some embodiments, the sensor array controller 211 may take into account both the coordinates of the positioning unit and information from the plurality of sensors to more accurately determine the current orientation of the anatomical planes.

Then, in step S802 the sensor array controller 211 controls each one of the plurality of aerial vehicles to maintain a set position relative to the one or more anatomical planes. By positioning the aerial vehicles at set positions relative to the user's body, using the anatomical planes as reference points, the sensor array controller 211 can ensure that the sensors maintain a full field of view around the user's entire body. For example, in an embodiment in which the sensor array comprises first, second, third and fourth aerial vehicles, the sensor array controller 211 may control the first and second aerial vehicles to adopt positions on opposite sides of the user's body along an intersection between the transverse plane and the sagittal plane, and control the third and fourth aerial vehicles to adopt positions on opposite sides of the user's body, along an intersection between the transverse plane and the frontal plane. This arrangement ensures that the aerial vehicles are disposed at uniform angular intervals around the user, allowing a more complete three-dimensional model of the user's current body position to be generated.

Finally, in some embodiments the system may comprise a second sensor array comprising a plurality of sensors mounted on a second plurality of aerial vehicles. The second sensor array can be used to map the surrounding physical setting and/or scan the environment for physical objects that could pose a collision risk, whilst the first plurality of aerial vehicles continually monitors the user's movements. For example, the second plurality of aerial vehicles may be controlled to scan the environment in more detail in the user's current direction of travel for obstacles that may present a collision hazard to the user, and/or to the aerial vehicles themselves. If any such obstacles are detected by the second sensor array, the system may issue warnings to the user which indicate the direction and distance of obstacles, and which indicate the limits of virtual space and vantage points. For example, such warnings may be provided to the user in the form of visual cues located in the periphery of the virtual reality display. Providing a collision avoidance system which can help the user to avoid obstacles in this way can allow the system to be deployed in more types of environment.

Furthermore, in some embodiments the system may comprise suitable apparatus capable of permitting unrestricted locomotion, for example in the form of an omnidirectional treadmill. In some embodiments which comprise an omnidirectional treadmill, the velocity and/or acceleration of the user's locomotive movement may be measured by suitable sensors included in the omnidirectional treadmill. The measured velocity and/or acceleration can be transmitted to the controller 110 and processed in parallel with data from the sensor array, allowing the avatar to be plotted as moving within a virtual setting in accordance with the user's own physical movements.

Embodiments of the invention have been described in which a user may interact with virtual objects, and be provided with physical feedback in the form of proprioceptive feedback and/or tactile stimulus at the corresponding part of the user's body, so as to provide a more immersive and convincing virtual experience. Interactions between the user and virtual objects may be categorised as 'user-solicited contact' or 'unsolicited contact', depending on whether the user has intentionally contacted the virtual object. The controller 110 may be configured to automatically determine whether contact between the user and any given virtual object was user-solicited or unsolicited. For example, the controller 110 may take into account various factors, including but not limited to: the proximity of the contacted body part to the object immediately before contact; the trajectory of the body part immediately before contact; the current direction in which the user is looking, based on eye-tracking information; whether the user reacts to the object; whether the user draws back from the object (i.e. moves away from the object after contact); the length of time for which the object is the focal point of the user's gaze, as being indicative of the level of fixation/inspection upon the object; and whether the object was within the periphery or outside of the user's field of view before, during and after contact.

In some embodiments, once it has been determined whether the contact between the user and a virtual object is solicited or unsolicited, the user's viewpoint may be reoriented accordingly. For example, when a new user-solicited contact is detected while the system is operating in the first-person mode, the user's viewpoint may be reoriented by zooming in on the object with which the user is interacting, thereby affording a clearer view of the object. As a further example, when a new user-solicited contact is detected while the system is operating in the third-person mode, one or more of the camera position, direction and zoom level may be adjusted to provide the user with a clearer view of the object than was afforded by the previous viewpoint.

In both of the above-described examples, a user's viewpoint is automatically reoriented without changing the display mode (i.e. first-person or third-person). However, in some embodiments, an automatic reorientation of the viewpoint in response to user-solicited contact with an object can include a transition from first-person to third-person perspectives, or vice versa. For example, if the system is operating in a third-person display mode and user-solicited contact with an object is detected, for instance when a user's gaze is directed at a virtual object within reach of the user and/or the user picks up the virtual object, the display mode may switch to a first-person perspective to afford a closer view of the object. When the user-solicited contact with the object has ended, for example if the user puts down the object and/or turns their gaze away from the object, the display mode may return to the third-person perspective. In other embodiments the opposite transition may occur, by automatically reorienting the viewpoint from first-person perspective to third-person perspective when user-solicited contact is detected.

As described above, in some embodiments of the invention the viewpoint may be automatically reoriented only when user-solicited contact is detected. In this way, automatic reorientation in the case of unsolicited contact, which would otherwise be disruptive to the user's current virtual embeddedness/engagement, can be avoided. As an example, in a scenario where the user is already engaged with one virtual object and an unsolicited contact occurs between the user and another virtual object, the system can determine that the contact with the other object is unsolicited and therefore avoid a potentially disruptive additional reorientation due to the unsolicited contact. In this scenario, the contact with the other object, which can be referred to as an 'unsolicited object', may be deemed to be unsolicited if any of the following events occur: the user ignores, i.e. does not react to the presence of the unsolicited object; the user moves the contacted body part away from the unsolicited object; the user attempts to disengage with or push away the unsolicited object; and/or a focus of the user's gaze remains upon the prior object. As a further example, in a scenario where the user inadvertently makes contact with a virtual object which is not deemed to be the focus of the user's attention, the system may determine that the contact is not user-solicited and can avoid automatically reorienting the viewpoint towards the contacted object.

In some embodiments, a contact event between part of the user's body and a virtual object may initially be unsolicited but may develop into user-solicited contact. For example, a user may unintentionally come into contact with a virtual object, but may then turn their attention to the object and begin engaging with it. In such scenarios, automatic reorientation may not occur immediately upon the unsolicited contact but may be delayed for a certain time while the system waits to see if the user engages with the object. If the user is deemed to be insufficiently reciprocating to the unsolicited object's contact, reorientation does not ensue. Conversely, when the user is deemed to be sufficiently reciprocating to an unsolicited object's contact, automatic reorientation may ensue. In some embodiments, a user may override the automatic reorientation function to prevent the viewpoint being automatically reoriented. For example, if a 'non-solicited object override' setting is selected, automatic reorientation may not ensue as a result of contact occurring with a non-solicited object.

By automatically reorienting the viewpoint as described above, the reorientation compliments the user's active engagement and/or inspection of the soliciting object, thereby providing a more intuitive user experience and making it easier for users to interact with virtual objects. Conversely, by preventing automatic reorientation when the user is deemed to be insufficiently engaging with an unsolicited object, an otherwise disruptive automatic reorientation can be avoided.

Furthermore, in situations in which the system is already providing contact-independent isomorphic visual-tactile feedback in the autoscopic mode of operation, such feedback may continue to be displayed from the new viewpoint when an automatic reorientation occurs. In such a scenario, tactile feedback commensurate with the newly-solicited contact can also be provided simultaneously with the pre-existing contact-independent isomorphic visual-tactile feedback.

Embodiments of the invention have been described in which an array of sensors mounted on a plurality of aerial vehicles adopt positions around a user to track the user's position and movements. In some embodiments, the system may also comprise a second array of sensors mounted on a second plurality of aerial vehicles, which may be referred to as a 'standby array'. In some embodiments in which contact-dependent automatic reorientation can occur, as described above, a standby array of aerial-vehicle-mounted sensors can be repositioned in advance of a contact event when it is predicted that current trajectories of the user and/or an object are due to intersect at a future point in time. In such a scenario, the system may predict a time and location of contact between the user and the object as a function of the relative velocities of the user and the object and their respective positions. For example, the time and location at which the contact is predicted to occur may be determined based on eye tracking received from an eye tracking sensor, and/or based on body position information determined using data captured by the vehicle-mounted sensor array. The aerial vehicles of the standby array can be controlled to adopt suitable positions relative to the predicted location of contact with the object, before the predicted time at which the contact will occur. Then, when contact occurs between the user and the object and the viewpoint is automatically reoriented as described above, the system can begin using the standby array to continue monitoring the user's position while operating in the reoriented viewpoint.

For example, in a scenario in which the system is initially operating in the first-person mode the first sensor array may adopt positions suitable for first-person operation, such as by positioning the sensors to track points on the front of the user's body without necessarily tracking points on the back of the user's body. At the same time, if a predicted contact is due to occur between the user and an object, the standby array may be controlled to adopt suitable positions for third-person operation in advance of the contact occurring. Then, when contact does occur, if the contact is deemed to be user-solicited and automatic reorientation ensues, the sensors of the second array are already in suitable positions to accurately track the user and enable third-person rendering from the reoriented viewpoint. In this example, it will be appreciated that the standby array can be positioned in advance without knowing whether the contact will be solicited or unsolicited. If the ensuing contact is deemed to be unsolicited, then automatic reorientation may not occur, and the standby array may no longer be required. For example, the aerial vehicles of the standby array may return to resting positions if not currently required.

Figure 9:
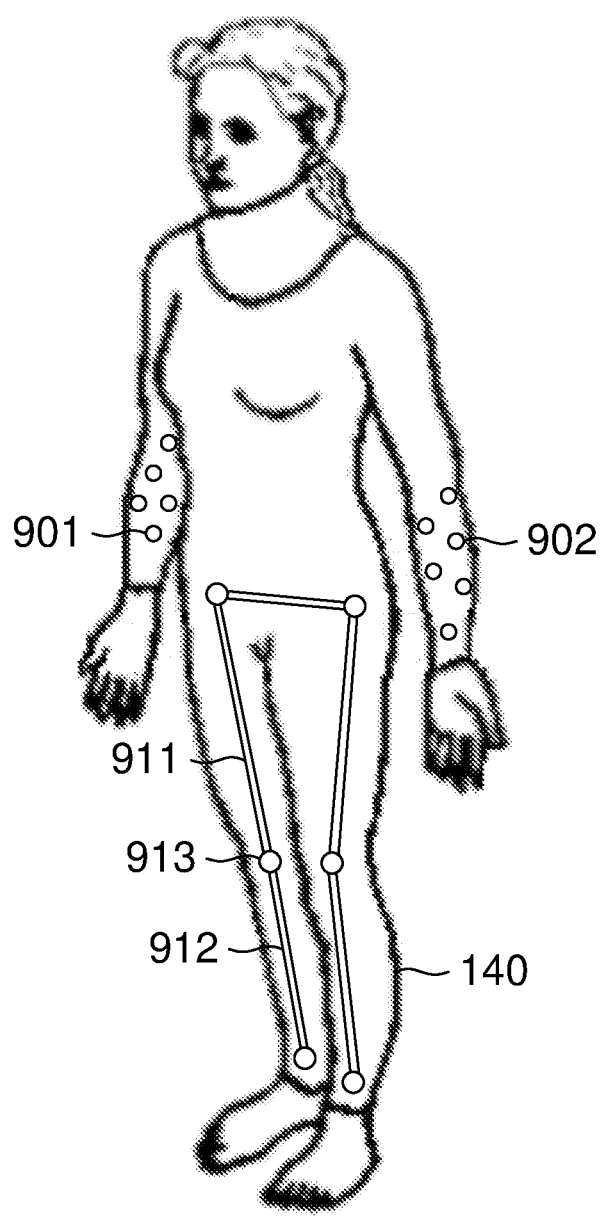
FIG. 9 illustrates a physical feedback mechanism in the form of an exoskeleton comprising a plurality of location sensors, according to an embodiment of the present invention.

Referring now to FIG. 9, the physical feedback mechanism 140 of FIG. 1 is illustrated in further detail, according to an embodiment of the present invention. The physical feedback mechanism 140 of the present embodiment is in the form of an exoskeleton, as has been described above, comprising a plurality of exoskeleton members 911, 912 connected by one or more moveable joints 913. For the sake of clarity, the construction of the exoskeleton members 911, 912 and joints 913 is simplified in FIG. 9, and only the lower part of the exoskeleton is illustrated. It will be appreciated that the exoskeleton may extend across a greater or lesser extent of the user's body than that illustrated in FIG. 9, depending on the requirements of a particular embodiment.

The physical feedback mechanism 140 of the present embodiment comprises a plurality of location sensors 901, 902 distributed over at least part of the user's body. The location sensors are configured to provide information on a current location of a respective surface of the user's body, in other words, a surface on which the location sensor 901, 902 is disposed. The controller 110 is configured to determine the current position of the user's body based on the information obtained using the plurality of aerial vehicle sensors and based on the information provided by the plurality of location sensors 901, 902. Examples of suitable location sensors include, but are not limited to, orientation sensors such as gyroscopes and/or movement sensors such as accelerometers, which may also be referred to as inertial sensors. The controller 110 can use information obtained from the location sensors 901, 902 to track changes in the locations of the respective sensors over time.

The information that can be obtained from the location sensors 901, 902 can complement the information obtained from the plurality of aerial vehicle sensors, and together both sets of information can be used to determine the current position of the user's body with a greater degree of accuracy. For example, depending on the current position of the user's body and a current spatial arrangement of the plurality of aerial vehicle sensors, one part of the user's body may be visible to one or more of the aerial vehicle sensors whilst another part of the user's body may be hidden from view of all of the aerial vehicle sensors. For example, if the user is crouching or has their arms held close to their body, it may not be possible to position the aerial vehicles so as to provide complete visibility of the user's entire body. A surface on the user's body that is currently hidden from view of the plurality of aerial vehicle sensors can be referred to as an "occluded surface", and a surface on the user's body that is currently visible to one or more of the plurality of aerial vehicle sensors can be referred to as a "visible" surface.

The location sensors 901, 902 may be distributed across a substantial portion of the user's body so as to increase the likelihood that for a given body position and configuration of aerial vehicles 101, 102, 103, 104 that results in there being one or more occluded surfaces, there will be at least one location sensor 901, 902 on the occluded surface(s). In this way, even though an occluded surface may not currently be visible to the aerial vehicle sensors, the controller 110 is still able to determine the current position of the user's body by determining the current position of the occluded surface based on information obtained from any of the location sensors that are disposed on the occluded surface. In embodiments in which the physical feedback mechanism includes joint sensors for measuring an angle of the user's joints, as described above, the controller no may also take into account information from any joint sensors on an occluded surface. At the same time, the controller 110 can continue to determine the current position of any visible surfaces based on the information obtained using the plurality of sensors, and may also take into account information from location sensors 901, 902 on visible surfaces to increase the accuracy of the determination.

The plurality of location sensors 901, 902 may include location sensors disposed on opposing surfaces of one or more parts of the user's body. In general, any two surfaces on the user's body that face in opposite directions can be considered to be "opposing" surfaces in this context. Examples of pairs of opposing surfaces of the user's body include, but are not limited to, the anterior and posterior sides of the torso, the palm and the back of the hand, the calf and the shin, and so on. For example, in the embodiment illustrated in FIG. 9 a plurality of first location sensors 901 are disposed on the anterior surfaces of both forearms, whilst a plurality of second location sensors 902 are disposed on the posterior surfaces of both forearms. Although in FIG. 9 location sensors 901, 902 are only illustrated on the forearms for clarity, it will be appreciated that the use of location sensors is not limited to these locations. In other embodiments the location sensors may be disposed on any other parts of the user's body as required, instead of or in addition to the forearms.

By disposing location sensors 901, 902 on opposing surfaces of the user's body, as in the present embodiment, can increase the likelihood that for a given body position and configuration of aerial vehicles 101, 102, 103, 104 that results in there being one or more occluded surfaces, there will be at least one location sensor 901, 902 on the occluded surface(s). Taking the forearm location sensors 901, 902 in FIG. 9 as an example, when the use holds their arms by their sides with palms facing inwards, the anterior surfaces of the forearms may not be visible to any of the aerial vehicle sensors, since the anterior surfaces of the forearms are facing inwards towards the sides of the torso. In such a scenario, the anterior surfaces of the forearms may constitute occluded surfaces, and the controller 110 may determine the current position of the anterior surfaces of the forearms based on the information provided by the first location sensors 901.

It should be appreciated that the term "opposing surfaces" as used above should not be construed as implying that the location sensors on any given body part, such as the head, torso, a limb or an extremity, are only disposed on two opposite sides of that part of the body, although this may be one possible arrangement. More detailed location information can be obtained from the location sensors by disposing the location sensors 901, 902 at numerous points around the circumference of a certain body part, such that the current position of the entire surface of the body part can be determined by the controller 110 with a high degree of accuracy. This may be referred to as "encasement", in that the location sensors 901, 902 may be considered to effectively surround and therefore encase the body part in a location sensor array.

An analogous principle of "encasement" may also be applied when configuring the exoskeleton. In other words, the exoskeleton members 911, 912 may be disposed so as to act on opposing surfaces of a part of the user's body. In this way, one or more actuators associated with a moveable joint 913 of the exoskeleton assembly can be used to exert a force on the body part in opposite directions (i.e. 'pushing' vs. 'pulling') via the respective exoskeleton members 911, 912 disposed on opposing surfaces of the body part. For example, controlling an actuator to exert a force on the user's lower leg via an exoskeleton member 912 disposed on the shin can encourage the user to bend their leg at the knee, whereas controlling an actuator to exert a force on the user's lower leg via an exoskeleton member 912 disposed on the calf (i.e. an opposing surface to the shin) can encourage the user to straighten their leg at the knee.

For joints that are only capable of pivoting in a single plane, such as the knee or elbow, it may be sufficient to only provide two exoskeleton members on a single pair of opposing surfaces, as in the example of the knee joint described above. In other areas of the body, for example in the case of joints that are capable of multidimensional rotation such as the hip or shoulder, in some embodiments more than two exoskeleton members may be disposed around the circumference of the respective part of the user's body so as to increase the degrees of freedom available to the physical feedback mechanism.

Although in FIG. 9 the physical feedback mechanism 140 comprises both a plurality of location sensors 901, 902 and an exoskeleton 911, 912, 913, it will be appreciated that in some embodiments a physical feedback mechanism such as an exoskeleton 911, 912, 913 may not comprise any such location sensors 901, 902. Furthermore, in other embodiments a plurality of location sensors 901, 902 may be used in combination with a different form of physical feedback mechanism other than an exoskeleton.

Systems such as those described herein may have various applications. In some embodiments the system may be used in a therapeutic context, such as during muscular/physical rehabilitation or the treatment of psychological conditions. For example, in some embodiments the system may be calibrated to capture and present visual information to persons with varying kinds of neuropsychological neglect (e.g., hemispatial) and visual impairments, or as a multisensory substitution and/or assistive communication device. As yet another example, in some embodiments the system may be used to assist mobility. For instance, in cases where the user is a subject suffering from restricted mobility, such as a person with multiple sclerosis or a physical injury, the physical feedback mechanism can be controlled to assist the user in performing movements that they would not be capable of executing independently.

In some embodiments tactile feedback may be used to somatically manage high levels of anxiety and to promote sensorimotor integration in persons with autism. The provision of stimulation using static and portable deep pressure devices in persons with autism has been reported to reduce state levels of anxiety and increase sensorimotor integration, whilst vibrohaptic stimulation has also been shown to promote social abilities in persons with autism.

In some embodiments the system may be used in educational, training and occupational contexts. As an example, in some embodiments the system may be used to train a user in various types of manual tasks, including but not limited to industrial, medical and engineering fields. As another example, in some embodiments the system may be used to permit user exploration of remotely rendered environments, such as inaccessible or hostile environments. In some embodiments, the system can comprise a communication system for remotely controlling a robotic device in dependence on the user's body movements, to enable tasks to be carried out remotely.

In some embodiments the system may be used within leisure and entertainment contexts. For example, immersive/interactive cinema, gaming, and remote travel scenarios.

Whilst certain embodiments of the invention have been described herein with reference to the drawings, it will be understood that many variations and modifications will be possible without departing from the scope of the invention as defined in the accompanying claims.

The invention claimed is:

1. A system comprising:
    a sensor array comprising a plurality of sensors each arranged to monitor a current position of one or more parts of the user's body;
    a plurality of aerial vehicles, at least some of the plurality of sensors being disposed on respective ones of the plurality of aerial vehicles;
    a sensor array controller configured to reposition the plurality of aerial vehicles so as to provide a line of sight between each of the plurality of sensors disposed on one of the plurality of aerial vehicles and a respective part of the user's body monitored by said one of the plurality of sensors;
    a physical feedback mechanism for providing physical feedback to the user, the physical feedback mechanism being configured to be worn on the user's body;
    a plurality of location sensors distributed over at least part of the user's body, each of the location sensors being configured to provide information on a current location of a respective surface of the user's body; and
    a controller configured to determine a current position of the user's body based on information obtained using the plurality of sensors and the information provided by the plurality of location sensors, and to control the physical feedback mechanism to provide physical feedback to the user in dependence on the determined position of the user's body,
    wherein the user's body may comprise visible surfaces and occluded surfaces depending on the current position of the user's body and a current spatial arrangement of the plurality of sensors disposed on the plurality of aerial vehicles, the visible surfaces comprising parts of the user's body visible to one or more of said plurality of sensors and the occluded surfaces comprising parts of the user's body hidden from view of said plurality of sensors,
    wherein the plurality of location sensors are disposed on at least two opposing surfaces of the one or more parts of the user's body, such that when one or more of the opposing surfaces is an occluded surface the controller is configured to determine the current position of said part of the user's body based on the information provided by said location sensors, and to determine the current position of any visible surfaces based on the information obtained using the plurality of sensors disposed on the plurality of aerial vehicles.

2. The system of claim 1, comprising:
a rendering unit configured to render an image including a virtual representation of at least part of the user's body, in dependence on the determined current position of the user's body; and
a display unit configured to display the rendered image to the user.

3. The system of claim 2, wherein the rendering unit is configured to render a third-person perspective view of the user's body from a viewpoint of one of the plurality of sensors,
wherein the system comprises a user interface configured to receive user input indicative of a desired viewpoint of the third-person perspective view, and the sensor array controller is configured to control one of the plurality of aerial vehicles to adopt a position corresponding to the desired viewpoint indicated by the user input, or
optionally wherein the system comprises a user interface configured to receive a user command to switch from a first-person viewing mode to a third-person viewing mode, wherein in response to the user command the rendering unit is configured to render the third-person perspective view of the user's body from the viewpoint of one of the plurality of sensors.

4. The system of claim 1, wherein the controller is configured to determine the current position of one or more visible surfaces based on the information obtained using the plurality of sensors, and based on information obtained from at least one of the plurality of location sensors disposed on said one or more visible surfaces, optionally wherein the plurality of location sensors comprise one or more orientation sensors and/or one or more movement sensors, such that information obtained from the one or more orientation and/or one or more movement sensors can be used to track changes in a location of the respective sensors over time.

5. The system of claim 1, wherein the physical feedback mechanism comprises:
a tactile feedback mechanism configured to provide tactile stimulus to at least part of the user's body,
wherein the tactile feedback mechanism comprises a plurality of actuators controllable to exert a variable force on a surface of the body,
wherein the plurality of actuators are more closely spaced in a region of the body having a higher density of touch receptors, and are less closely spaced in a region of the body having a lower density of touch receptors.

6. The system of claim 1, wherein the physical feedback mechanism comprises:
a kinaesthetic feedback mechanism configured to provide kinaesthetic stimulus to at least part of the user's body.

7. The system of claim 6, wherein the kinaesthetic feedback mechanism comprises an exoskeleton assembly configured to be worn on part or the whole of the user's body, the exoskeleton assembly comprising:
a plurality of exoskeleton members connected by one or more moveable joints, and
one or more actuators associated with each moveable joint of the exoskeleton assembly, each actuator being controllable by the controller to provide the kinaesthetic stimulus by exerting a force on respective ones of the plurality of exoskeleton members connected to said moveable joint, wherein the system comprises one or more joint sensors each configured to detect a position of a corresponding one of said one or more moveable joints, and the controller is configured to determine the current position of the user's body based on information obtained from the one or more joint sensors and based on the information obtained from the plurality of sensors disposed on the plurality of aerial vehicles,
wherein one or more of the location sensors are disposed between joints of the user's body,
wherein the physical feedback mechanism is configured to exert a variable resistance to the user's movements in dependence on control signals received from the controller, and the plurality of exoskeleton members include one or more adaptive members configured to have a controllable bending stiffness and/or comprise two or more exoskeleton members disposed on opposing surfaces of one or more parts of the user's body.

8. The system of claim 1, comprising:
a positioning unit disposed on the user's body, the positioning unit configured to determine coordinates of a current location of the positioning unit in three-dimensional space,
wherein the sensor array controller is configured to control each one of the plurality of aerial vehicles to maintain a set position in three-dimensional space relative to the determined coordinates,
wherein the sensor array controller is configured to control the plurality of aerial vehicles to adopt positions at least a minimum distance from the determined coordinates of the positioning unit,
wherein the sensor array controller is configured to determine the minimum distance in dependence on a known location of the positioning unit on the user's body, and on a maximum distance from said known location that can be reached by maximal extension of one or more limbs of the user's body,
optionally wherein the sensor array controller is configured to determine a length of each of said one or more limbs based on information obtained using the plurality of sensors, and to determine the maximum distance in dependence on the determined length of the one or more limbs.

9. The system of claim 8, wherein the plurality of aerial vehicles comprise a master aerial vehicle and one or more slave aerial vehicles, wherein the sensor array controller is configured to set a respective position for each of the one or more slave aerial vehicles relative to the position of the master aerial vehicle.

10. The system of claim 9, comprising:
wherein the controller is configured to determine a current gaze point of the user, and the sensor array controller is configured to position the master aerial vehicle such that one of the plurality of sensors disposed on the master aerial vehicle is directed towards the determined gaze point,
optionally wherein the system comprises an eye tracking sensor configured to detect a current gaze direction of the user, and the controller is configured to determine the current gaze point based on information received from the eye tracking sensor, and reposition the master aerial vehicle in dependence on a determination that the current gaze point differs from a previously-determined gaze point, optionally wherein the sensor array controller is configured to set the position for the master aerial vehicle relative to the determined coordinates of the positioning unit.

11. The system of claim 9, comprising:
wherein different ones of the plurality of aerial vehicles may be designated as the master aerial vehicle, and
wherein the sensor array controller is configured to designate one of the one or more slave aerial vehicles as the master aerial vehicle in response to a change in the coordinates of the positioning unit and/or an orientation of the user's body,
optionally wherein the controller is configured to determine whether a predicted time for the master aerial vehicle to move from its current location to the set position for the master aerial vehicle exceeds a time limit, and to control the master aerial vehicle to move from its current location to the set position for the master aerial vehicle in response to a determination that the predicted time does not exceed the time limit, or to designate said one of the slave aerial vehicles as the master aerial vehicle in dependence on a determination that the predicted time exceeds the time limit,
optionally wherein the time limit is set in dependence on the user's current speed of movement, such that a shorter time limit is set when the user is moving more quickly.

12. The system of claim 1, wherein the plurality of sensors are moveably mounted such that each sensor can be independently reoriented,
wherein the sensor array controller is configured to reorient one or more of the plurality of sensors in addition to repositioning the plurality of aerial vehicles, so as to provide a line of sight between each one of the plurality of sensors and a respective part of the user's body monitored by said one of the plurality of sensors.

13. The system of claim 1, wherein the plurality of sensors comprises a head-mounted sensor configured to be worn on the user's head,
wherein the sensor array controller is configured to reorient the head-mounted sensor,
wherein the head-mounted sensor is an imaging sensor arranged so as to capture an image indicative of the user's current field of view.

14. The system of claim 1, wherein the plurality of sensors are configured to have variable focal lengths,
wherein the sensor array controller is configured to increase or decrease a focal length of one or more of the plurality of sensors in addition to repositioning the plurality of aerial vehicles, so as to provide a line of sight between each one of the plurality of sensors and a respective part of the user's body monitored by said one of the plurality of sensors.

15. The system of claim 1, wherein the sensor array controller is configured to determine a number of the aerial vehicles required to determine the current position of the user's body with a desired degree of accuracy,
wherein in response to the determined number of aerial vehicles being less than a number of aerial vehicles currently comprised in the sensor array, the sensor array controller is configured to switch one or more redundant aerial vehicles into a standby mode in which said one or more redundant aerial vehicles do not form part of the sensor array, and
wherein in response to the determined number of aerial vehicles being greater than the number of aerial vehicles currently comprised in the sensor array, the sensor array controller is configured to switch one or more aerial vehicles from the standby mode into an active mode in which said one or more aerial vehicles form part of the sensor array,
optionally wherein the sensor array controller is configured to take into account a current body position of the user when determining the number of aerial vehicles required.

16. The system of claim 1, wherein the sensor array controller is configured to determine a current orientation in space of one or more anatomical planes of the user's body, based on information obtained using the plurality of sensors, and is further configured to control each one of the plurality of aerial vehicles to maintain a set position relative to the one or more anatomical planes.

17. The system of claim 16, comprising:
a positioning unit disposed on the user's body, the positioning unit configured to determine coordinates of a current location of the positioning unit in three-dimensional space,
wherein the sensor array controller is configured to control each one of the plurality of aerial vehicles to maintain a set position in three-dimensional space relative to the determined coordinates,
wherein the sensor array controller is configured to determine the current orientation in space of said one or more anatomical planes based on the determined coordinates of the positioning unit.

18. The system of claim 16, wherein the one or more anatomical planes include a frontal plane, and/or a sagittal plane, and/or a transverse plane,
optionally wherein the plurality of aerial vehicles comprise first, second, third and fourth aerial vehicles, the sensor array controller is configured to control the first and second aerial vehicles to adopt positions on opposite sides of the user's body along an intersection between the transverse plane and the sagittal plane, and the sensor array controller is configured to control the third and fourth aerial vehicles to adopt positions on opposite sides of the user's body, along an intersection between the transverse plane and the frontal plane.

19. The system of claim 1, wherein the plurality of sensors comprise a plurality of cameras arranged to capture images of the user's body,
wherein the tactile feedback controller is configured to apply a body recognition algorithm to one or more images captured by the plurality of cameras to determine whether an object is part of the user's body,
optionally wherein the plurality of cameras comprise infrared depth cameras.

20. The system of claim 1, wherein the plurality of location sensors include two or more location sensors disposed at a plurality of points around a circumference of said one or more parts of the user's body, such that the controller can determine a current position of the surface of said one or more parts of the user's body using information obtained from said two or more location sensors,
optionally wherein one or more of the location sensors are disposed between joints of the user's body.

21. The system of claim 1, wherein said opposing surfaces of the one or more parts of the user's body comprise a pair of surfaces that face in opposite directions.

22. A system comprising:
a sensor array comprising a plurality of sensors each arranged to monitor a current position of one or more parts of the user's body;

a plurality of aerial vehicles, at least some of the plurality of sensors being disposed on respective ones of the plurality of aerial vehicles;

a sensor array controller configured to reposition the plurality of aerial vehicles so as to provide a line of sight between each of the plurality of sensors disposed on one of the plurality of aerial vehicles and a respective part of the user's body monitored by said one of the plurality of sensors;

a physical feedback mechanism for providing physical feedback to the user, the physical feedback mechanism being configured to be worn on the user's body;

a plurality of location sensors distributed over at least part of the user's body, each of the location sensors being configured to provide information on a current location of a respective surface of the user's body; and a controller configured to determine a current position of the user's body based on information obtained using the plurality of sensors and the information provided by the plurality of location sensors, and to control the physical feedback mechanism to provide physical feedback to the user in dependence on the determined position of the user's body, wherein the user's body may comprise visible surfaces and occluded surfaces depending on the current position of the user's body and a current spatial arrangement of the plurality of sensors disposed on the plurality of aerial vehicles, the visible surfaces comprising parts of the user's body visible to one or more of said plurality of sensors and the occluded surfaces comprising parts of the user's body hidden from view of said plurality of sensors, wherein the plurality of location sensors are disposed on at least two opposing surfaces of the one or more parts of the user's body, such that when one or more of the opposing surfaces is an occluded surface the controller is configured to determine the current position of said part of the user's body based on the information provided by said location sensors, and to determine the current position of any visible surfaces based on the information obtained using the plurality of sensors disposed on the plurality of aerial vehicles, wherein the plurality of aerial vehicles comprise a master aerial vehicle and one or more slave aerial vehicles, wherein the sensor array controller is configured to set a respective position for each of the one or more slave aerial vehicles relative to the position of the master aerial vehicle, and wherein the controller is configured to determine a current gaze point of the user, and the sensor array controller is configured to position the master aerial vehicle such that one of the plurality of sensors disposed on the master aerial vehicle is directed towards the determined gaze point.

* * * * *